United States Patent
Chapman et al.

(10) Patent No.: US 9,463,386 B1
(45) Date of Patent: Oct. 11, 2016

(54) STATE MACHINE SCRIPTING IN COMPUTER-IMPLEMENTED GAMES

(75) Inventors: Peter Chapman, Frisco, TX (US); Andrew Foster, Irving, TX (US); Michael Capps, Dallas, TX (US)

(73) Assignee: Zynga Inc., San Francisco, CA (US)

(*) Notice: Subject to any disclaimer, the term of this patent is extended or adjusted under 35 U.S.C. 154(b) by 511 days.

(21) Appl. No.: 13/460,181

(22) Filed: Apr. 30, 2012

Related U.S. Application Data

(60) Provisional application No. 61/557,266, filed on Nov. 8, 2011.

(51) Int. Cl.
| | |
|---|---|
| A63F 13/60 | (2014.01) |
| A63F 13/69 | (2014.01) |
| A63F 13/49 | (2014.01) |
| G06F 11/36 | (2006.01) |

(52) U.S. Cl.
CPC ............... *A63F 13/60* (2014.09); *A63F 13/69* (2014.09); *A63F 13/49* (2014.09); *A63F 2300/5526* (2013.01); *A63F 2300/5533* (2013.01); *G06F 11/3644* (2013.01)

(58) Field of Classification Search
CPC .... G06F 11/3644; A63F 13/49; A63F 13/60; A63F 13/69; A63F 2300/5526; A63F 2300/5533
USPC ............ 463/1, 9; 700/E17.041; 707/E17.041
See application file for complete search history.

(56) References Cited

U.S. PATENT DOCUMENTS

| | | | | |
|---|---|---|---|---|
| 6,031,549 A * | 2/2000 | Hayes-Roth | ............ | G06T 13/40 345/474 |
| 6,160,986 A * | 12/2000 | Gabai | .................... | G09B 5/065 434/307 R |
| 6,425,825 B1 * | 7/2002 | Sitrick | .................... | A63F 13/00 348/E5.058 |
| 7,478,047 B2 * | 1/2009 | Loyall | .................... | G10L 13/00 704/258 |
| 7,493,305 B2 * | 2/2009 | Thusoo et al. | | |
| 7,778,948 B2 * | 8/2010 | Johnson | ................... | G09B 7/02 704/8 |
| 7,867,086 B2 * | 1/2011 | Sitrick | ........................... | 463/31 |
| 8,032,618 B2 * | 10/2011 | Criddle | .................... | G06F 8/65 709/220 |
| 8,074,199 B2 | 12/2011 | Millett et al. | | |
| 8,137,201 B2 * | 3/2012 | Chickering | ........... | G06F 17/272 273/260 |

(Continued)

OTHER PUBLICATIONS

Raim, Jarret. "Finite State Machines in Games." 2004. Powerpoint Presentation. 27 pages.*

(Continued)

*Primary Examiner* — William H McCulloch, Jr.
(74) *Attorney, Agent, or Firm* — Schwegman Lundberg & Woessner, P.A.

(57) ABSTRACT

A gaming environment may be established, by executing a game engine module to provide an interactive game instance, and instantiating a state machine instance using one or both of a state machine client module or a state machine server module. In an example, during execution of the game engine module, scripting commands within a state machine definition may be parsed and executed to obtain information indicative of one or more of a state of an in-game object or a state transition of an in-game object. An in-game object may be controlled within the game instance via the state machine using at least a portion of the information obtained from parsing and executing the scripting commands. Use of the state machine definitions in conjunction with the scripting commands may enable representation of complex scenarios for virtual objects and events in the gaming environment in a simplified format.

25 Claims, 9 Drawing Sheets

(56) References Cited

U.S. PATENT DOCUMENTS

| | | | | |
|---|---|---|---|---|
| 8,167,712 | B2* | 5/2012 | Sarkar et al. | 463/29 |
| 8,237,743 | B2* | 8/2012 | Csurka | A63F 13/10 345/619 |
| 8,317,611 | B2* | 11/2012 | Sitrick | B05B 15/001 463/31 |
| 8,660,849 | B2* | 2/2014 | Gruber | G06F 17/3087 340/988 |
| 8,683,429 | B2* | 3/2014 | Mueller | G06T 13/40 345/156 |
| 8,753,204 | B2* | 6/2014 | Manton et al. | 463/31 |
| 8,758,130 | B2* | 6/2014 | Sitrick | B05B 15/001 463/31 |
| 8,764,560 | B2* | 7/2014 | Sitrick | B05B 15/001 463/31 |
| 8,769,122 | B2* | 7/2014 | Hutcheson et al. | 709/228 |
| 8,795,091 | B2* | 8/2014 | Sitrick | B05B 15/001 463/31 |
| 8,821,276 | B2* | 9/2014 | Sitrick | A63F 13/02 463/31 |
| 8,876,611 | B2* | 11/2014 | Yuan | G07F 17/3225 463/31 |
| 8,905,843 | B2* | 12/2014 | Sitrick | B05B 15/001 463/30 |
| 9,364,744 | B2* | 6/2016 | Auterio | A63F 13/12 |
| 2001/0044339 | A1 | 11/2001 | Cordero | A63F 13/12 463/42 |
| 2003/0122858 | A1* | 7/2003 | Mauve | A63F 13/12 715/706 |
| 2004/0249885 | A1* | 12/2004 | Petropoulakis | G06F 9/54 709/204 |
| 2005/0091637 | A1* | 4/2005 | Schechter | G06F 8/31 717/110 |
| 2006/0247053 | A1* | 11/2006 | Mattila | A63F 13/12 463/42 |
| 2007/0094325 | A1* | 4/2007 | Ih et al. | 709/203 |
| 2007/0207852 | A1* | 9/2007 | Nelson et al. | 463/42 |
| 2007/0293292 | A1* | 12/2007 | Gipp et al. | 463/16 |
| 2008/0018049 | A1* | 1/2008 | Hebden | 273/292 |
| 2008/0039206 | A1* | 2/2008 | Ackley et al. | 463/40 |
| 2008/0045335 | A1* | 2/2008 | Garbow | A63F 13/12 463/29 |
| 2008/0068389 | A1* | 3/2008 | Bakalash | G06F 9/5044 345/505 |
| 2008/0070659 | A1* | 3/2008 | Naicker | 463/12 |
| 2008/0085766 | A1* | 4/2008 | Sitrick | B05B 15/001 463/31 |
| 2009/0042646 | A1* | 2/2009 | Sarkar et al. | 463/29 |
| 2009/0143126 | A1* | 6/2009 | O'Kane, Sr. | G09B 7/02 463/9 |
| 2009/0149243 | A1* | 6/2009 | Naicker et al. | 463/25 |
| 2010/0138775 | A1* | 6/2010 | Kohen et al. | 715/781 |
| 2010/0178985 | A1* | 7/2010 | Chickering et al. | 463/42 |
| 2010/0227675 | A1* | 9/2010 | Luxton et al. | 463/25 |
| 2010/0312865 | A1* | 12/2010 | Criddle | G06F 9/45504 709/221 |
| 2011/0105229 | A1* | 5/2011 | Sitrick | B05B 15/001 463/31 |
| 2011/0130184 | A1* | 6/2011 | Mills | 463/13 |
| 2011/0312423 | A1* | 12/2011 | Mosites et al. | 463/25 |
| 2012/0094758 | A1* | 4/2012 | Sitrick | A63F 13/02 463/31 |
| 2012/0172120 | A1* | 7/2012 | Sitrick | B05B 15/001 463/31 |
| 2012/0196677 | A1* | 8/2012 | Sitrick | B05B 15/001 463/32 |
| 2012/0252572 | A1* | 10/2012 | Ackley et al. | 463/29 |
| 2012/0257820 | A1* | 10/2012 | Sanghvi | G06F 9/4856 382/159 |
| 2012/0289303 | A1* | 11/2012 | Jagannatha et al. | 463/17 |
| 2013/0053151 | A1* | 2/2013 | Sohn | G07F 17/32 463/42 |
| 2013/0101976 | A1* | 4/2013 | Roots et al. | 434/362 |
| 2013/0116046 | A1* | 5/2013 | Manton et al. | 463/31 |
| 2013/0311969 | A1* | 11/2013 | Mueller | G06T 13/40 717/105 |
| 2014/0031129 | A1* | 1/2014 | Morrison | A63F 13/12 463/42 |
| 2014/0031130 | A1* | 1/2014 | Janakiraman | A63F 13/12 463/42 |
| 2014/0073427 | A1* | 3/2014 | Sitrick | B05B 15/001 463/31 |
| 2014/0221092 | A1* | 8/2014 | Manton et al. | 463/31 |
| 2016/0101357 | A1* | 4/2016 | Miller | G07F 17/32 463/42 |
| 2016/0101362 | A1* | 4/2016 | McCaffrey | A63F 13/10 463/29 |
| 2016/0144279 | A1* | 5/2016 | Manton | A63F 13/00 463/33 |

OTHER PUBLICATIONS

Stewart, Kevin. "XML Finite State Machine in C#." Code Project website. Copyright 2002. Accessed Jul. 12, 2012. <http://www.codeproject.com/Articles/2063/XML-Finite-State-Machine-in-C>.*

Glenday, Craig. "Guiness World Records 2009." May 2009. Bantam Books. Title, Copyright, and p. 241. Accessed Google Books at <https://books.google.com/books?id=aHYt0RNSDfgC&lpg=PA269&dq=9780553592566&pg=PA241#v=onepage&q&f=false>.*

"U.S. Appl. No. 13/460,123, Response filed Sep. 15, 2014 to Restriction Requirement mailed Jul. 15, 2014", 10 pgs.

"U.S. Appl. No. 13/460,123, Restriction Requirement mailed Jul. 15, 2014", 6 pgs.

"Data-driven animation states", [Online]. Retrieved from the Internet: <URL: http://gamedev.stackexchange.com/questions/27079/data-driven-animation-states>, (Accessed Jul. 12, 2012), 3 pgs.

"Search for AI Architecture on AIWisdom.com", [Online]. Retrieved from the Internet: <URL: http://www.aiwisdom.com/ai_architecture.html>, (Accessed Jul. 12, 2012), 8 pgs.

Bayliss, Jessica D, et al., "Games as a "Flavor" of CS1", ACM SIGCSE Bulletin, vol. 38, No. 1, (Mar. 2006), 500-504.

Brownlee, Jason, "Finite State Machines (FSM)", [Online]. Retrieved from the Internet: <URL: http://ai-depot.com/FiniteStateMachines/FSM-Background.html>, (Accessed Jul. 12, 2012), 6 pgs.

Champandard, Alex J, "Common Way to Implement Finite State Machines in Games", [Online]. Retrieved from the Internet: <URL: http://aigamedev.com/open/article/fsm-implementation/>, (Nov. 16, 2007), 4 pgs.

Dragert, Christopher, et al., "Toward High-Level Reuse of Statechart-based AI in Computer Games", Gas '11, Proceeding of the 1st International Workshop on Games and Software Engineering, (2011), 25-28.

GBGAMES, "State of the Art Game Objects", [Online]. Retrieved from the Internet: <URL: http://gbgames.com/blog/2010/10/state-of-the-art-game-objects/>, (Oct. 27, 2010), 10 pgs.

Gill, Sunbir, "Visual Finite State Machine AI Systems", [Online]. Retrieved from the Internet: <URL: http://www.gamasutra.com/view/feature/2165/visual_finite_state_machine_ai_.php>, (Nov. 18, 2004), 5 pgs.

Krajewski, John, "Creating All Humans: A Data-Driven AI Framework for Open Game Worlds", [Online]. Retrieved from the Internet: <URL: http://www.gamasutra.com/view/feature/1862/creating_all_humans_a_datadriven_.php>, (Feb. 4, 2009), 3 pgs.

Stewart, Kevin, "XML Finite State Machine in C#", [Online]. Retrieved from the Internet: <URL: http://www.codeproject.com/Articles/2063/XML-Finite-State-Machine-in-C>, (Mar. 31, 2002), 3 pgs.

Verdia, Jamie B, "State Machines by Example: A Useful FSM", [Online]. Retrieved from the Internet: <URL: http://magicscrollsofcode.blogspot.com/2012/02/state-machines-by-example-useful-fsm.html>, (Feb. 13, 2012), 10 pgs.

"U.S. Appl. No. 13/460,123, Examiner Interview Summary mailed Jan. 13, 2016", 2 pgs.

(56) References Cited

OTHER PUBLICATIONS

"U.S. Appl. No. 13/460,123, Examiner interview Summary mailed Sep. 9, 2015", 6 pgs.
"U.S. Appl. No. 13/460,123, Final Office Action mailed Jan. 13, 2016", 16 pgs.
"U.S. Appl. No. 13/460,123, Response filed Mar. 12, 2015 to Non-Final Office Action mailed Dec. 12, 2014", 20 pgs.
"U.S. Appl. No. 13/460,123, Non Final Office Action mailed Dec. 12, 2014", 15 pgs.
Wagner, Ferdinand, et al., "Modeling Software with Finite State Machines: A Practical Approach", Auerbach Publications, ISBN: 978-0849380860 (Chapters 4-10), (May 16, 2006), 63-202.
"U.S. Appl. No. 15/091,932, Preliminary Amendment filed Apr. 26, 2016", 11 pgs.

\* cited by examiner

STATE MACHINE SCRIPTING IN COMPUTER-IMPLEMENTED GAMES

PRIORITY CLAIM

This application claims priority under 35 U.S.C. 119(e) to U.S. Provisional Patent Application Ser. No. 61/557,266, filed Nov. 8, 2011, which is incorporated herein by reference in its entirety.

TECHNICAL FIELD

This disclosure generally relates to games and gaming applications in general, such as computer-implemented online games role-playing games (RPGs), for example being playable by more than one person from more than one location, and also to data-driven state machines used in such games and applications.

DESCRIPTION OF EXAMPLE EMBODIMENTS

Figure 1:
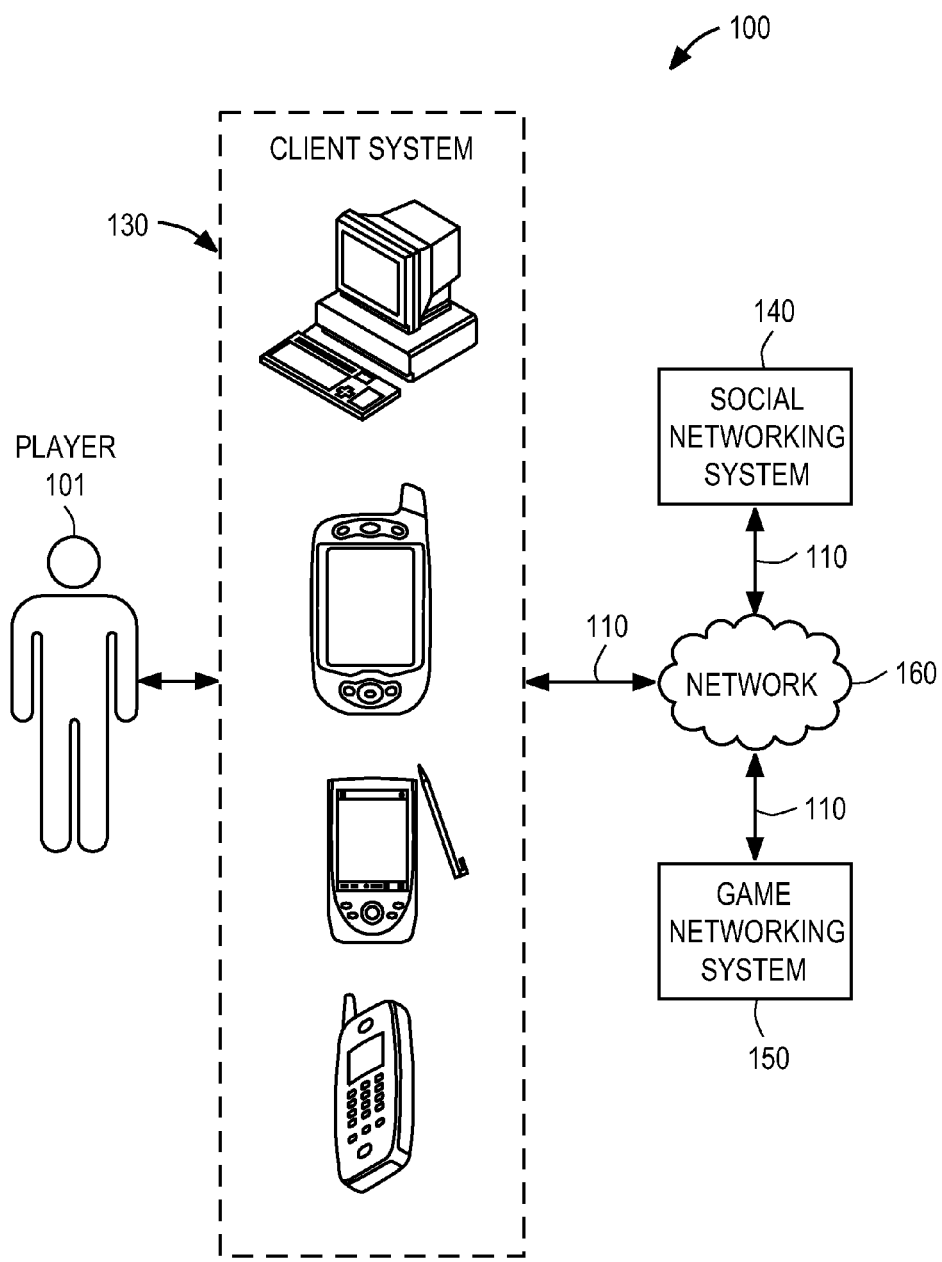
FIG. 1 illustrates an example of a system for implementing particular disclosed embodiments.

A state machine (also known as a finite state machine (FSM) or finite-state automaton) may be used to control an in-game object, such as a behavior or appearance of an object included as a portion of a multi-player online game. Such a state machine may be data and event driven, and may be instantiated using information obtained from one or more databases or state machine definition files.

Various scripting and dynamic interaction techniques relevant to such data-driven state machines are disclosed herein. Data-driven state machines may be used in a variety of software settings, but are particularly useful in the design and implementation of software-implemented games that present a plurality of game-related states, events, and actions that change as a result of user interaction and game rules. For example, data-driven state machines may be implemented in role playing games to navigate through the various states and actions resulting from the sequential events of game play, without requiring special programming for each action or use case.

In an example of some embodiments, systems and methods may be used to establish a gaming environment executing a game engine module to provide an interactive game instance, and instantiating a state machine using one or more of a state machine client module or a state machine server module. In an example, during execution of the game engine module, scripting expressions within a state machine definition may be parsed and interpreted to obtain information indicative of one or more of a state of an in-game object, a state transition of an in-game object, or other game environment value. An in-game object may be controlled within the game instance via the state machine using at least a portion of the information obtained from parsing the script expressions. Use of the state machine definitions in conjunction with scripting commands may enable representation of complex scenarios for virtual objects and events in the gaming environment in a simplified format, simplifying development.

For example, data-driven state machines may be used to implement certain state machine definitions of player actions in a particular game that are described and implemented in terms of state machine states. Each state may be defined to specify the visual appearance of the item, and in what interactions it may participate. In the example of an interactive game with a "farming" component, for example, a crop goes from a "planted" state, through various "growing" states, and finally waits in a "ripe" state for a period of time before continuing to a "withered" state. While in the "ripe" state, the crop may be harvested and while in the "withered" state the crop may be cleared. Various user interactions with the crop may further affect the state in which the crop remains.

This process of defining, interpreting, and implementing relevant states and actions may be applied for any number of virtual objects presented in a game or other software application. Use of a state machine to implement actions and events in the game or other software application may further provide a simplified technique to develop complex rule-based scenarios, without requiring specialized programming code to handle each action or event. Additionally, providing a data-driven state machine architecture allows designers to define the various objects in a standardized format with minimal need for programmer support. Accompanied by dynamic scripting expressions and a definition scheme for the state machine, use of the state machine definitions may result in reduced development times and implementation complexity.

As will be apparent, data-driven state machines may be used in a variety of environments and architectures, and the particular game or software environment that implements the presently disclosed state machine scripting techniques may vary significantly based on user requirements, game types, software environments, and like factors. The following describes example gaming and social network environments in which the presently described embodiments may be implemented, followed by implementation details of example systems and methods for establishing and utilizing data-driven scripting techniques.

Example Gaming Environment

In many online computer games, there is a virtual world or some other imagined playing space where a player of the game controls one or more player characters (herein "characters," "player characters," or "PCs"). Player characters may be considered in-game representations of the controlling player. As used herein, the terms player, user, entity, and friend may refer to the in-game player character controlled by that player, user, entity, or friend, unless context suggests otherwise. A game display may display a representation of the player character. A game engine accepts inputs from the player, determines player character actions, decides outcomes of events, and presents the player with a game display illuminating game play. In some games, there are multiple players, wherein each player controls one or more player characters.

An electronic social networking system typically operates with one or more social networking servers providing interaction between users such that a user may specify other users of the social networking system as "friends." A collection of users and the "friend" connections between users may form a social graph that may be traversed to find second, third and more remote connections between users, much like a graph of nodes connected by edges may be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems may typically be accessed using browser clients (e.g., Firefox, Chrome, Internet Explorer).

FIG. 1 illustrates an example of a system for implementing various disclosed embodiments. In some example embodiments, system 100 includes player 101, social networking system 140, game networking system 150, client system 130, and network 160. The components of system 100 may be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 140 is a network-addressable computing system that may host one or more social graphs. Social networking system 140 may generate, store, receive, and transmit social networking data. Social networking system 140 may be accessed by the other components of system 100 either directly or via network 160. Game networking system 150 is a network-addressable computing system that may host one or more online games. Game networking system 150 may generate, store, receive, and transmit game-related data, such as, for example, game account data, game input, game state data, and game displays. Game networking system 150 may be accessed by the other components of system 100 either directly or via network 160. Player 101 may use client system 130 to access, send data to, and receive data from social networking system 140 and game networking system 150. Client system 130 may access social networking system 140 or game networking system 150 directly, via network 160, or via a third-party system. As an example and not by way of limitation, client system 130 may access game networking system 150 via social networking system 140. Client system 130 may be any suitable computing device, such as a personal computer, laptop, cellular phone, smart phone, computing tablet, or the like.

Although FIG. 1 illustrates a particular number of players 101, social networking systems 140, game networking systems 150, client systems 130, and networks 160, this disclosure contemplates any suitable number of players 101, social networking systems 140, game networking systems 150, client systems 130, and networks 160. As an example and not by way of limitation, system 100 may include one or more game networking systems 150 and no social networking systems 140. As another example and not by way of limitation, system 100 may include a system that comprises both social networking system 140 and game networking system 150. Moreover, although FIG. 1 illustrates a particular arrangement of player 101, social networking system 140, game networking system 150, client system 130, and network 160, this disclosure contemplates any suitable arrangement of player 101, social networking system 140, game networking system 150, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi, Long Term Evolution (LTE), Long Term Evolution-Advanced (LTE-A), or Worldwide Interoperability for Microwave Access (WiMAX)) or optical (such as, for example, Synchronous Optical Network (SONET) or Synchronous Digital Hierarchy (SDH)) connections. In some example embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 140, game networking system 150, client system 130, and network 160, this disclosure contemplates any suitable connections between player 101, social networking system 140, game networking system 150, client system 130, and network 160. As an example and not by way of limitation, in some example embodiments, client system 130 may have a direct connection to social networking system 140 or game networking system 150, bypassing network 160.

Online Games and Game Systems

In an online computer game, a game engine often manages the game state of the game. In the present disclosure, game states of at least in-game objects may be managed by the game engine in co-operation with a data-driven state machine, as described in greater detail herein. Game state that may be managed and implemented by a game engine or a state machine may include game play parameters, including player character state, non-player character (NPC) state, in-game object state, game world state (e.g., internal game clocks, game environment), and other game play parameters. Each player 101 controls one or more player characters (PCs). The game engine or state machine may control all other aspects of the game, including non-player characters (NPCs), and in-game objects. The game engine or state machine may also manage game state, including player character state for currently active (online) and inactive (offline) players.

An online game may be hosted by game networking system 150, which may be accessed using any suitable connection with a suitable client system 130. A player may have a game account on game networking system 150, wherein the game account may contain or provide a variety of information associated with the player (e.g., the player's personal information, financial information, purchase history, player character state, game state). In some example embodiments, a player may play multiple games on game networking system 150, which may maintain a single game account for the player with respect to all the games, or multiple individual game accounts for each game with respect to the player. In some example embodiments, game networking system 150 may assign a unique identifier to each player 101 of an online game hosted on game networking system 150. Game networking system 150 may determine that a player 101 is accessing the online game by reading the user's cookies, which may be appended to Hypertext Transfer Protocol (HTTP) requests transmitted by client system 130, and/or by the player 101 logging onto the online game.

In some example embodiments, player 101 may access an online game and control the game's progress via client system 130 (e.g., by inputting commands to the game at the client device). Client system 130 may display the game interface, receive inputs from player 101, transmit user inputs or other events to the game engine, and receive instructions from the game engine. The game engine may be executed on any suitable system (such as, for example, client system 130, social networking system 140, or game networking system 150). As an example and not by way of limitation, client system 130 may download client components of an online game, which are executed locally, while a remote game server, such as game networking system 150, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 150.

Game Play

In some example embodiments, player 101 may engage in, or cause a player character controlled by him to engage in, one or more in-game actions. For a particular game, various types of in-game actions may be available to player 101. As an example and not by way of limitation, a player character in an online role-playing game may be able to interact with other player characters, build a virtual house, attack enemies, go on a quest, perform certain assigned tasks, and go to a virtual store to buy/sell virtual items. As another example and not by way of limitation, a player character in an online poker game may be able to play at specific tables, place bets of virtual or legal currency for certain amounts, discard or hold certain cards, play or fold certain hands, and play in a online poker tournament.

In some example embodiments, player 101 may engage in an in-game action by providing one or more user inputs to client system 130. Various actions may require various types and numbers of user inputs. Some types of in-game actions may require a single user input. As an example and not by way of limitation, player 101 may be able to harvest a virtual crop by clicking on it once with a mouse. Some types of in-game actions may require multiple user inputs. As another example and not by way of limitation, player 101 may be able throw a virtual fireball at an in-game object by entering the following sequence on a keyboard: DOWN, DOWN and RIGHT, RIGHT, B. This disclosure contemplates engaging in in-game actions using any suitable number and type of user inputs.

In some example embodiments, player 101 may perform an in-game action on an in-game object. An in-game object is any interactive element of an online game. In-game objects may include, for example, PCs, NPCs, in-game assets and other virtual items, in-game obstacles, game elements, game features, and other in-game objects. This disclosure contemplates performing in-game actions on any suitable in-game objects. For a particular in-game object, various types of in-game actions may be available to player 101 based on the type of in-game object. As an example and not by way of limitation, if player 101 encounters a virtual bear, the game engine may give him the options of shooting the bear or petting the bear. Some in-game actions may be available for particular types of in-game objects but not other types. As an example and not by way of limitation, if player 101 encounters a virtual rock, the game engine may give him the option of moving the rock; however, unlike the virtual bear, the game engine may not allow player 101 to shoot or pet the virtual rock. Furthermore, for a particular in-game object, various types of in-game actions may be available to player 101 based on the game state of the in-game object. As an example and not by way of limitation, if player 101 encounters a virtual crop that was recently planted, the game engine may give him only the option of fertilizing the crop, but if player 101 returns to the virtual crop later when it is fully grown, the game engine may give him only the option of harvesting the crop.

In some example embodiments, the game engine may cause one or more game events to occur in the game. Game events may include, for example, a change in game state, an outcome of an engagement, a completion of an in-game obstacle, a transfer of an in-game asset or other virtual item, or a provision of access, rights and/or benefits. In some example embodiments, a game event is any change in game state. Similarly, any change in game state may be a game event. This disclosure contemplates any suitable type of game event. As an example and not by way of limitation, the game engine may cause a game event where the virtual world cycles between daytime and nighttime every 24 hours. As another example and not by way of limitation, the game engine may cause a game event where a new instance, level, or area of the game becomes available to player 101. As yet another example and not by way of limitation, the game engine may cause a game event where player 101's player character heals one hit point every five minutes.

In some example embodiments, a game event or change in game state may be an outcome of one or more in-game actions. The game engine may determine the outcome of a game event or a change in game state according to a variety of factors, such as, for example, game logic or rules, player character in-game actions, player character state, game state of one or more in-game objects, interactions of other player characters, or random calculations. As an example and not by way of limitation, player 101 may overcome an in-game obstacle and earn sufficient experience points to advance to the next level, thereby changing the game state of player 101's player character (it advances to the next character level). As another example and not by way of limitation, player 101 may defeat a particular boss NPC in a game instance, thereby causing a game event where the game instance is completed, and the player advances to a new game instance. As yet another example and not by way of limitation, player 101 may pick the lock on a virtual door to open it, thereby changing the game state of the door (it goes from closed to open) and causing a game event (the player may access a new area of the game).

In some example embodiments, player 101 may access particular game instances of an online game. A game instance is copy of a specific game play area that is created during runtime. In some example embodiments, a game instance is a discrete game play area where one or more players 101 may interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In some example embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In some example embodiments, an online game comprises only one game instance that all players 101 of the online game may access.

In some example embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. As used herein, a player who is thus uniquely associated with a specific game instance, and to whom certain actions are exclusively available, is referred to as a "host player."

Such a game instance associated with a specific player may be accessible by one or more other players, either synchronously or asynchronously with the specific player's game play. As an example and not by way of limitation, a first player (i.e., the host player) may be associated with a first game instance, but the first game instance may be accessed by all first-degree friends in the first player's social network. As used herein, players thus accessing a game instance associated with another player are referred to as "guest players." In some example embodiments, the game engine may create a specific game instance for a specific player when that player accesses the game. As an example and not by way of limitation, the game engine may create a first game instance when a first player initially accesses an online game, and that same game instance may be loaded each time the first player accesses the game.

In some example embodiments, the set of in-game actions available to a specific player may be different in a game instance that is associated with that player (e.g., in which the player is a host player) compared to a game instance that is not associated with that player (e.g., in which the player is a guest player). The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

Social Graphs and Social Networking Systems

In some example embodiments, a game engine may interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph may have a node for each entity and edges to represent relationships between entities. A node in a social graph may represent any entity. In some example embodiments, a unique client identifier may be assigned to each user in the social graph. This disclosure assumes that at least one entity of a social graph is a player or player character in an online multiplayer game, though this disclosure may apply to any suitable social graph users.

The minimum number of edges to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend."

Within the social graph, each player (or player character) has a social network. A player's social network includes all users in the social graph within Nmax degrees of the player, where Nmax is the maximum degree of separation allowed by the system managing the social graph (such as, for example, social networking system 140 or game networking system 150). In one example embodiment, Nmax equals 1, such that the player's social network includes only first-degree friends. In another example embodiment, Nmax is unlimited and the player's social network is coextensive with the social graph.

In some example embodiments, the social graph is managed by game networking system 150, which is managed by the game operator. In other example embodiments, the social graph is part of a social networking system 140 managed by a third-party (e.g., Facebook, Friendster, Myspace, Google+). In yet other example embodiments, player 101 has a social network on both game networking system 150 and social networking system 140, wherein player 101 may have a social network on the game networking system 150 that is a subset, superset, or independent of the player's social network on social networking system 140. In such combined systems, game networking system 150 may maintain social graph information with edge type attributes that indicate whether a given friend is an "in-game friend," an "out-of-game friend," or both. The various example embodiments disclosed herein are operable when the social graph is managed by social networking system 140, game networking system 150, or both.

Figure 2:
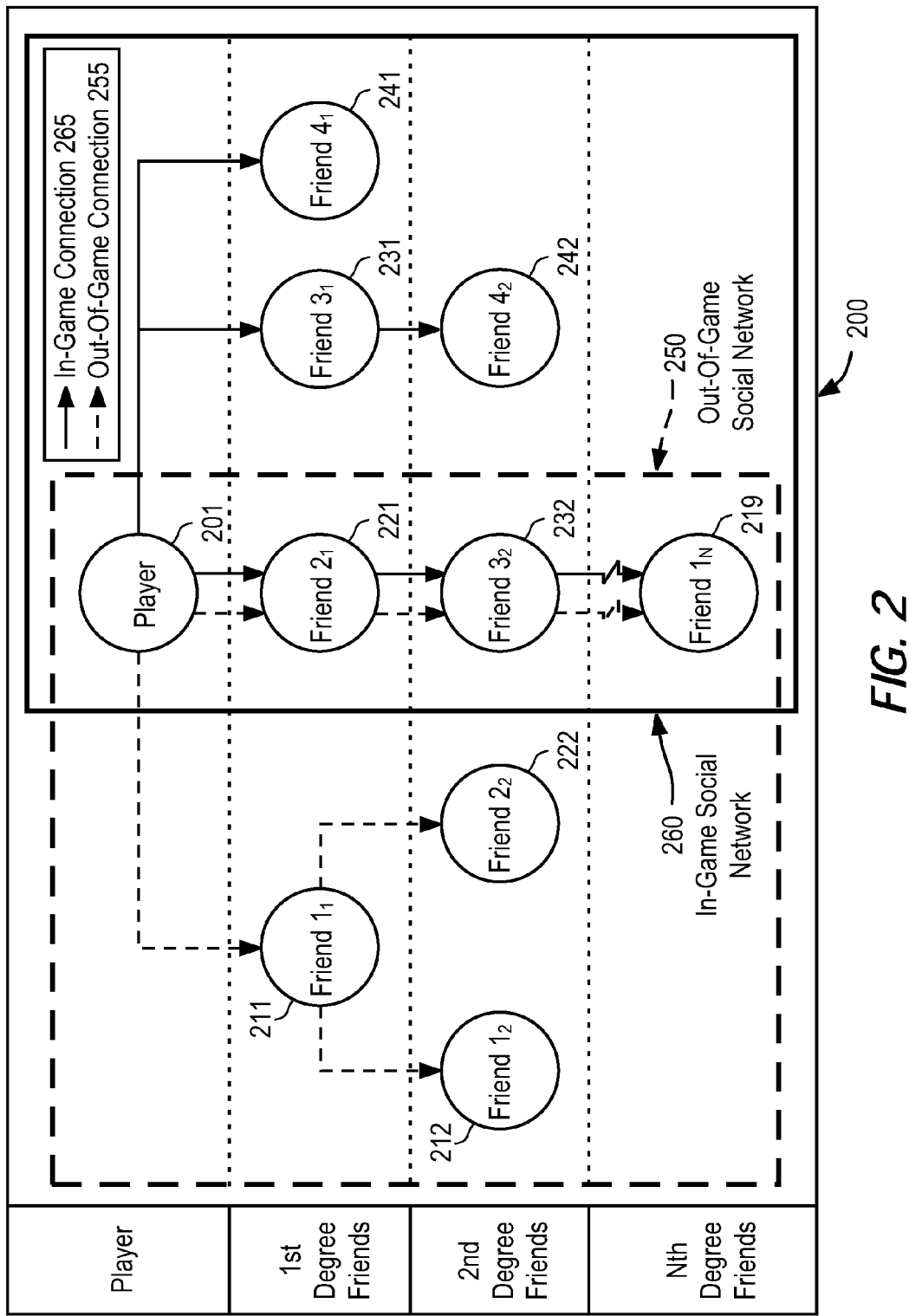
FIG. 2 illustrates an example social network.

FIG. 2 shows an example of a social network within a social graph 200. As shown, Player 201 may be associated, connected, or linked to various other users, or "friends," within the social network 250. These associations, connections, or links may track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of out-of-game social network 250 will be described in relation to Player 201. As used herein, the terms "player" and "user" may be used interchangeably and may refer to any user or character in an online multiuser game system or social networking system. As used herein, the term "friend" may mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 140.

In various example embodiments, Player 201 may have Nth-degree friends connected to him through a chain of intermediary degree friends, as indicated in FIG. 2. For example, Nth-degree Friend $1_N$ 219 is connected to Player 201 via second-degree Friend $3_2$ 232 and one or more other higher-degree friends. Various example embodiments may take advantage of and utilize the distinction between the various degrees of friendship relative to Player 201.

In some example embodiments, a player (or player character) may have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some example embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 may have second-degree and higher-degree friends in both his in-game and out-of-game social networks. In some example embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network 250, but a first-degree friend in Player 201's in-game social network 260. In some example embodiments, a game engine may access in-game social network 260, out-of-game social network 250, or both.

In some example embodiments, the connections in a player's in-game social network 260 may be formed both explicitly (e.g., users must "friend" each other) and implicitly (e.g., system observes user behaviors and "friends" users to each other). Unless otherwise indicated, reference to a friend connection between two or more players may be interpreted to cover both explicit and implicit connections, using one or more social graphs and other factors to infer friend connections. The friend connections may be unidirectional or bidirectional. It is also not a limitation of this description that two players who are deemed "friends" for the purposes of this disclosure are not friends in real life (i.e., in disintermediated interactions or the like), but that could be the case.

In multiplayer online games, two or more players may play in the same game instance. Game play is asynchronous when the players do not play simultaneously in the game instance. In some example embodiments, synchronous game play between two players in the same game instance may be simulated from asynchronous game play by recording the game play of a first player in the game instance at a first time and replaying that game play during the game play of a second player in the game instance at a later time. In some example embodiments, the game engine may record the in-game actions of a first player in a game instance for later play-back by other players in the game instance, and then the game engine loads and executes the previously recorded in-game actions during the game play of other players in the game instance.

Example System

Figure 3:
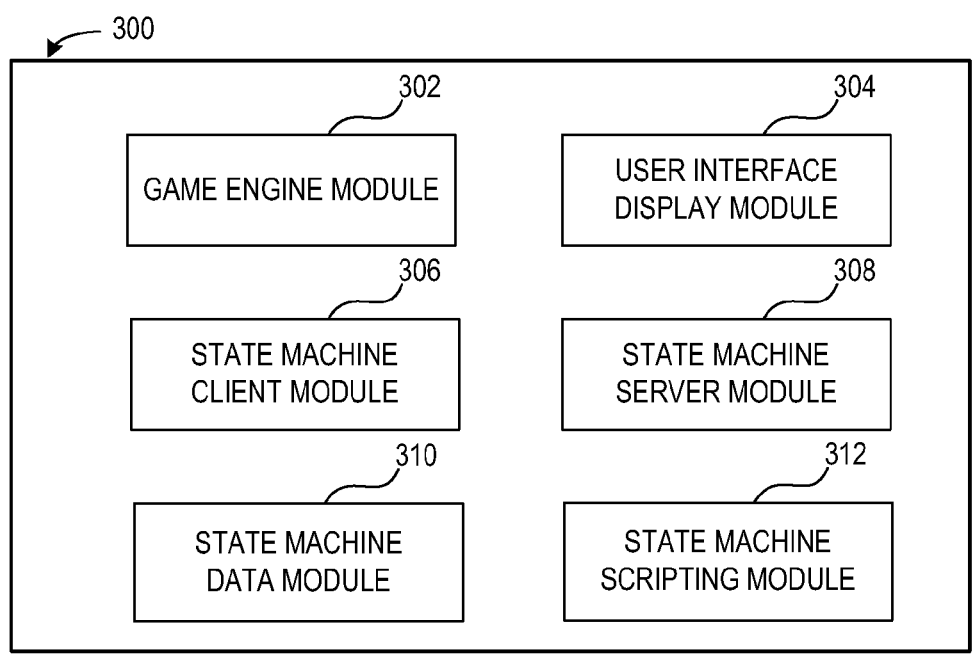
FIG. 3 illustrates an example system for implementing particular disclosed embodiments.

FIG. 3 illustrates an example system 300 for implementing some example embodiments. The system 300 may comprise a number of hardware-implemented modules provided by one or more processors. The system 300 may include a game engine module 302 to manage a multiplayer online game. To this end, the game engine module 302 may include game logic to manage in-game object and non-player character behavior, and to execute in-game actions responsive to user input. The game engine module 302 may interact with a user interface display module 304 to generate a user interface to display the game and game-related graphics and text, and accept user commands and input in connection with particular game instances and the gaming environment.

A state machine client module 306 may be provided to interpret and perform state machine actions on a client interface, such as interacting with client-side scripting or other client-side capabilities on a user gaming interface, in connection with the game engine module 302. A state machine server module 308 may be provided to interpret and perform state machine actions on a server, such as interacting with server-side scripting or other server-side actions used to generate the game display for client users, in connection with the game engine module 302. Although state machine client module 306 and state machine server module 308 are illustrated as being included in a single system 300, it will be understood that in some embodiments client-side components and modules such as state machine client module 306 may be provided or otherwise operate in a first system that is separate from a second system providing server-side components and modules such as state machine server module 308.

A state machine data module 310 may be provided to read state machine definitions from a data source (for example, an XML file or a database) and provide the state machine definitions data to one or both of the state machine client module 306 and state machine server module 308. Alternatively, the state machine data module 310 may be implemented within functionality provided by either or both the state machine client module 306 and state machine server module 308. The state machine scripting module 312 may be configured to interpret scripting language commands (including tokens, expressions, and other terms provided according to a scripting syntax) provided within the state machine data definitions. The state machine data definitions may be provided in an XML format which include scripting commands in-line to the XML-format data. The state machine data definitions including any scripting language commands may then be provided to the state machine client module 306 and state machine server module 308 to perform actions on the client and server as appropriate. In an alternative example embodiment, the scripting commands may be provided in a scripting file or data set separate from the state machine data definitions, and the state machine data definitions may contain a series of tokens or other text indicators used for inserting values from execution of the scripting commands.

Functionality of the system 300 and its respective modules, in accordance with an example embodiment, is further described herein with respect to example methods.

Example Methods

Figure 4:
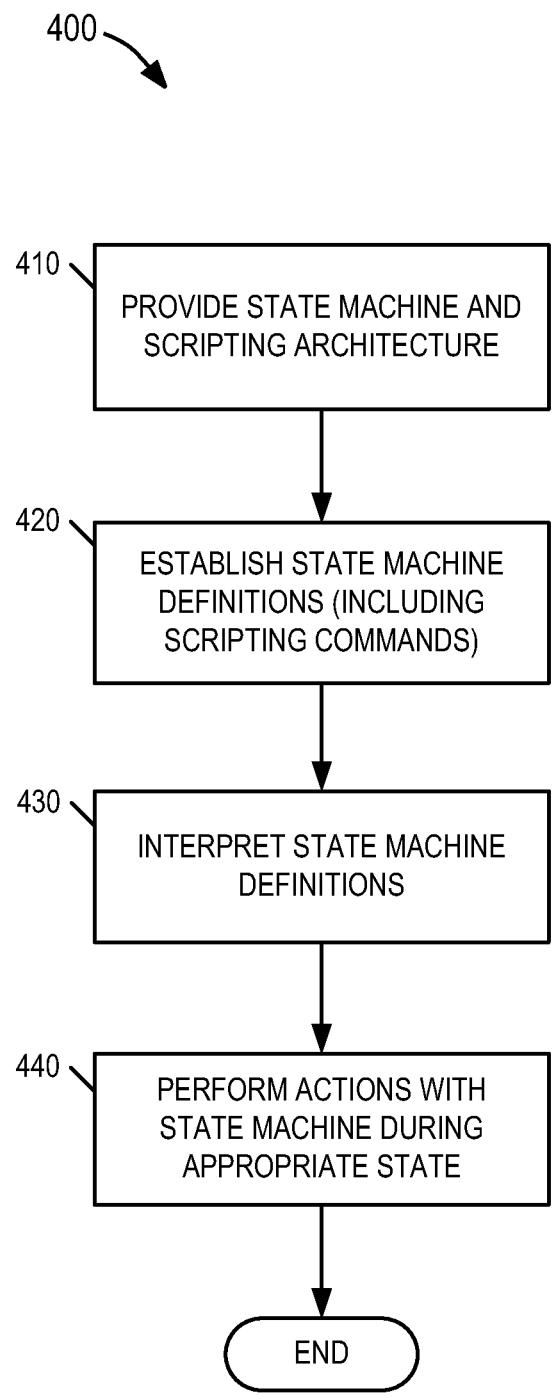
FIG. 4 illustrates an example flowchart of a method for implementing particular disclosed embodiments.

FIG. 4 illustrates a flowchart 400 of a high-level view of an example method to implement and use scripting techniques within a data-driven state machine and state machine definitions, for example, in a user interface provided in connection with an instance of a multiplayer online game. The example method 400 may be implemented by the system 300 (FIG. 3) or other suitably configured systems.

The method of flowchart 400 includes providing a state machine and scripting architecture at operation 410. This may include providing various executable state machine objects and modules configured to access and read state machine definitions, interpret the state machine definitions, and implement the state machine definitions in connection with an ongoing state for a software application such as a game. These objects and modules may include both client-side and server-side objects and modules for a server-hosted game. For the scripting architecture, this may include providing various state machine scripting modules, such as a scripting parser used in connection with a state machine, that is configured to parse script expressions in or outside of the state machine definitions, and determine appropriate data values or perform certain actions during execution of a state with the state machine.

The method of flowchart 400 further includes establishing state machine definitions, including scripting commands within the state machine definitions, at operation 420. This may include providing definitions and script expressions in XML, another markup language, or a similar parsable definition format of data providing state information that may be interpreted by the state machine architecture components.

The method of flowchart 400 further includes interpreting one or more state machine definitions (including scripting commands within the state machine definitions as applicable) at operation 430. The interpretation of the state machine definitions may be performed by the various state machine and scripting architecture components deployed on client and server side operations. For example, in connection with server side operations, the interpretation of the appropriate state as identified in the state machine definitions may be performed directly or indirectly in conjunction with the operations of a server-operating game engine.

The method of flowchart 400 further includes performing actions with the state machine during the appropriate state at operation 440. For example, once state machine definitions are loaded and the appropriate state is determined in a state-dependent game, the state machine definitions may be employed to implement game-related actions, respond to user gaming interactions in various states, implement certain rules and responses for ongoing events, and generally perform state-appropriate actions as the game play progresses.

Example Data-Driven State Machine Architecture

In an example embodiment, a state machine is provided for execution of state machine actions in connection with both client and server operations (such as in a client-server setting for a client user interface accessing a server-hosted game engine). Each state intended to be parsed by the state machine is defined for each type of virtual in-game item as a textual string in a state machine definition, and provided to both the client and the server. Each action performed by the state machine may be implemented as a separate transaction that is sent from the client and processed on the server, as the client user interface is updated as appropriate. In the present example embodiment, some or all of the activities (items, states, actions, and transactions) may be provided using a state machine definition prior to use of the activities by the state machine.

Figure 5:
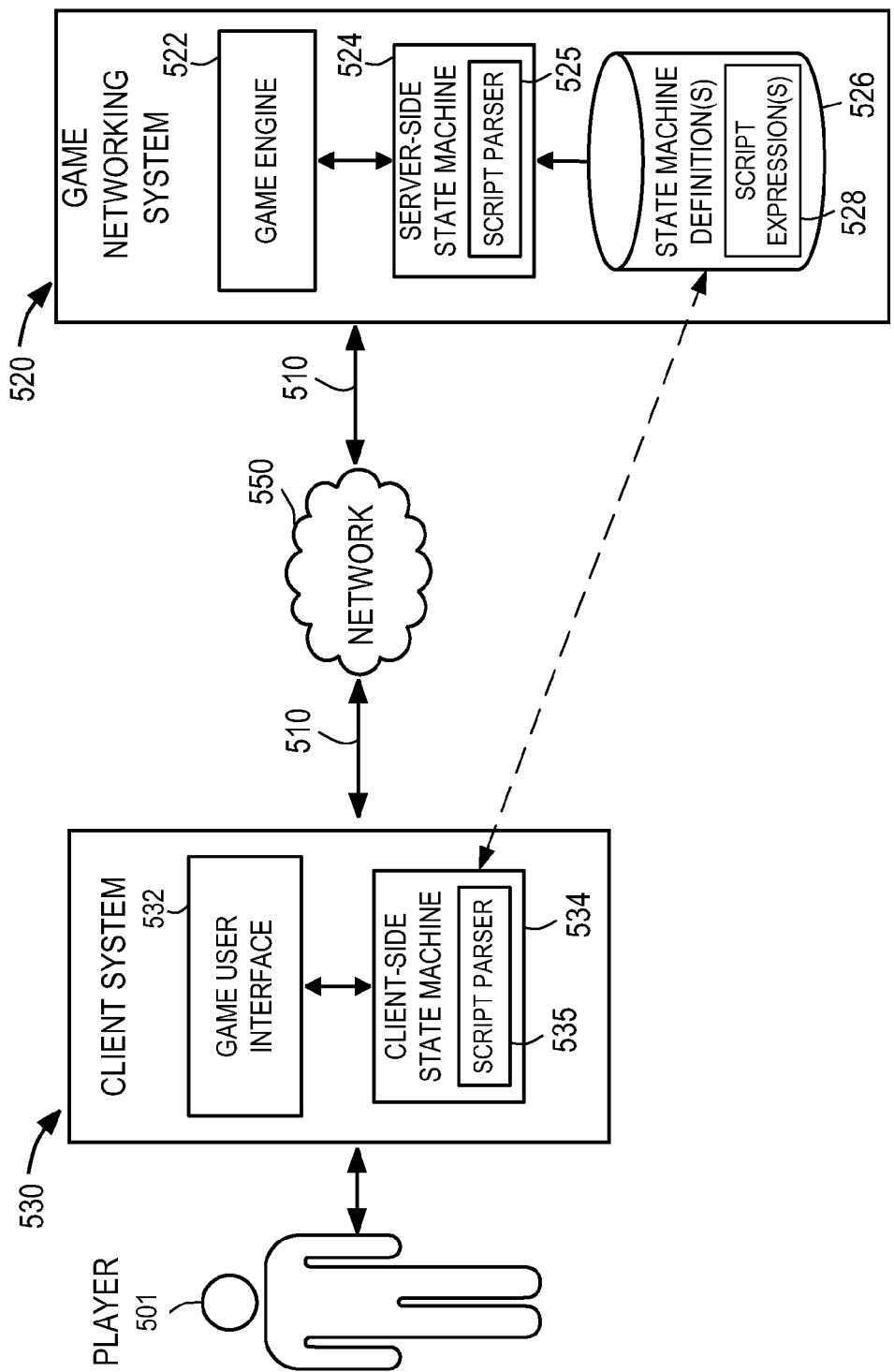
FIG. 5 illustrates an example layout of a data-driven state machine architecture used in connection with particular disclosed embodiments.

FIG. 5 provides an overview of a state machine architecture provided between a server and client according to one example embodiment, involving the connection between a client system 530 and a game networking system 520. As illustrated, a player 501 accesses a client system 530 that provides a game user interface 532 having one or more game displays (such as in connection with an ongoing role playing game). The client system 530 implements a client-side state machine 534 in communication with the game user interface 532. The client system 530 is used to implement display effects and interactions for game items and game play in the game user interface 532 as appropriate.

In an example, the game networking system 520, which as illustrated is implemented as a server-hosted game, provides a game engine 522, server-side state machine 524, and a set of state machine definitions 526. The state machine definitions 526 are communicated or accessed by the server-side state machine 524, and are communicated directly or indirectly (such as via network 550 and network connections using one or more network connections to the game networking system 520) to client-side state machine 534. The state machine definitions are then interpreted accordingly by the server-side state machine 524 and client-side state machine 534, which in turn affect operation of the game engine 522 and game user interface 532 respectively. For example, the game engine 522 may implement various actions and effects on in-game objects and the virtual game play as the game state changes, while the game user interface 532 may change the display or user interactivity available through the game user interface 532 as the game state changes.

Each of the server-side state machine 524 and client-side state machine 534 further contain a script parser 535 and 525 respectively, the script parser 535, 525 being configured to parse and interpret script expressions 528 included in the state machine definitions 526. For example, the server-side state machine 524 may be configured to translate the script expressions 528 into a server-executable expression executable in connection with the game engine 522, such as a PHP script (executable on a PHP-enabled web server) Likewise, the client-side state machine 534 may be configured to translate the script expressions 528 into a client-executable expression, such as an ActionScript expression executable in connection with the game user interface 532 (executable in an Adobe Flash user environment, for example).

In one example embodiment, state machine definitions 526 (embedded with script expressions 528) are specified in an XML file or in a similar data store of a parsable markup language format that is transmitted to the client system 530 along with other game-related data from the game networking system 520. The state machine definitions 526 may be combined with other game-parsable definitions used on either or both of the client system 530 and game networking system 520. For example, the state machine definitions 526 may be provided in a XML file that is also used to provide a number of other game settings. Such a configuration enables a single data-driven system that is implemented in the client and server code to interpret the definitions and produce the desired state functionality.

In a further example embodiment, the state machine objects provided for operation on a client system 530 or the server-side game networking system 520 may be configured to: load state machine definitions from an XML format source; parse the state machine definitions from the XML format source; and provide functionality to implement and perform individual states as provided in the state machine definition. The state machine object may be configured, for example, to load each state "node" as an object in code that describes how the object works. With this type of an object configuration, a state machine object may maintain its own state (such as what is the current state, when was the state entered, what actions may be performed from the state, and the like).

In this model, on the client, each item (or select items) in the game instance may have a State Machine object as a member, initialized from the XML format source. When a player interacts with the interactive game, for example by clicking on an item, a determination is made using the State Machine object of which actions are available for the current game mode. If only one action is available, the action is executed; however, if there is more than one action available to a player, then a selection of actions may be offered (such as through a fly-out menu that appears in the game instance to allow the player to select the action to take).

Once an action is performed in the game instance, the costs and effects are processed and a single transaction ("TInteraction") may be sent to the server. The server receives the transaction and first determines the current state of the item. Once the state is determined, the action is checked for availability, and if the action is available, costs and effects are processed on the server. Additional processing may be performed based on game rules and action results. When this transaction cycle is completed, the item will be synchronized between both of the client and server.

Providing the state machine definitions 526 into a game settings file enables the state machine data to be specified in one place, rather than in multiple classes on both the client and the server. Further, because some or all of the details for provision and management of in-game objects are in data as opposed to code, there is less code (both client and server) needed for each new behavior to be implemented in the game. Game logic executed by the game engine 522 may thus be configured to apply to in-game objects of different types in generic fashion, with particular properties or aspects relating to the states or state behavior of different types of objects being governed by the data-driven state machine 534. A further benefit is that implementation and iteration of new gameplay scenarios may happen at a much faster pace. Alterations or additions to game state behavior of in-game objects may also be achieved without editing or changing game logic executed by the game engine.

FIG. 5 further illustrates the state machine definitions 526 as including the script expressions 528. The script expressions 528 may be used by the server-side state machine 524 or the client-side state machine 534 to obtain or provide specific values for the state machine definitions 526 at runtime. For example, the script expressions 528 may be used to obtain a property or value of the game with the state machine definitions that can only be determined during runtime of the game or some specific game state.

Although the preceding state machine architecture was described with relation to a separate client-side state machine and server-side state machine, it will be apparent that similar operations may be conducted in connection with a single state machine, for example in instances of asynchronous game play such as where a game engine is located at the client system 530. Therefore, general references to a "state machine" as used herein may refer to a client-side state machine, a server-side state machine, or a state machine operating independent of a client-server configuration.

State Machine Definitions and Scripting

Figure 6:
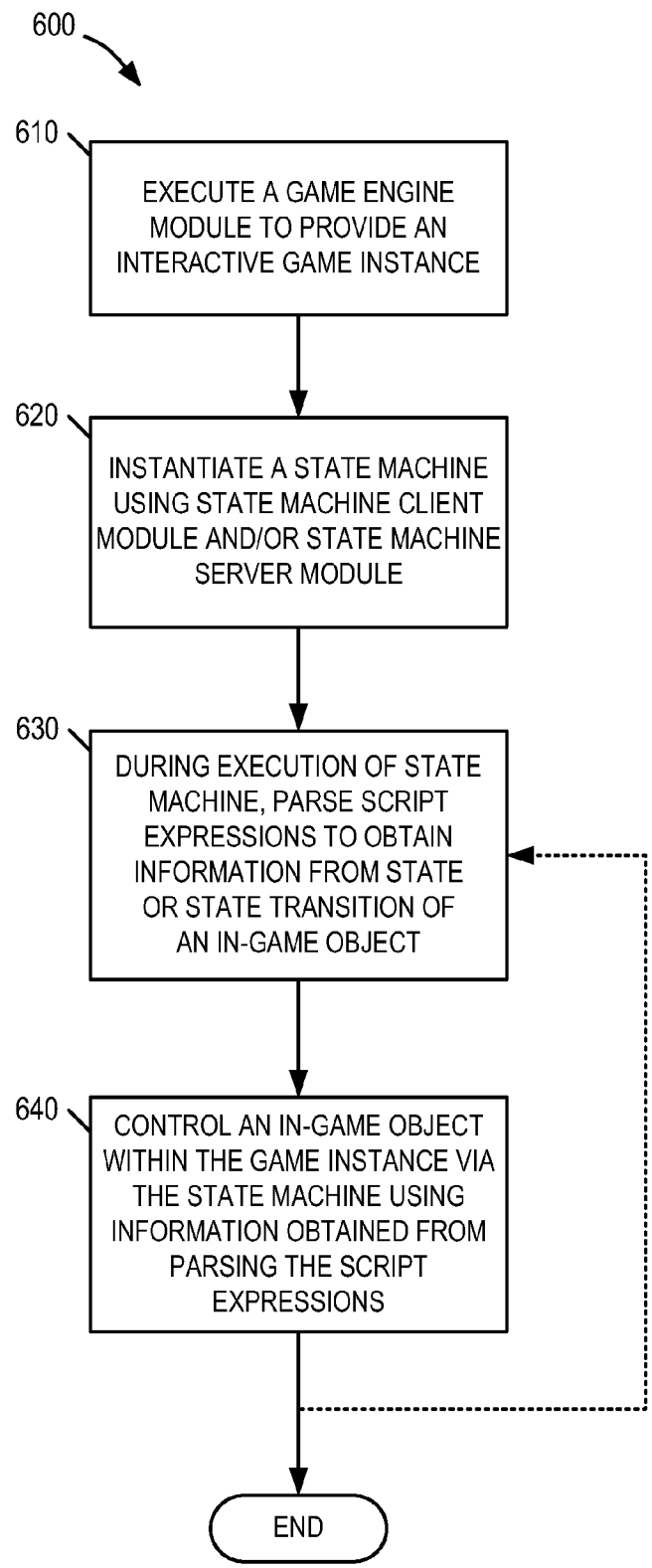
FIG. 6 illustrates an example flowchart of a method performed in a gaming environment using state machine scripting in connection with particular disclosed embodiments.

FIG. 6 illustrates an example flowchart of a method 600 for establishing a gaming environment using a state machine. In some example embodiment, at operation 610, a game engine module may be executed to provide an interactive game instance. Such an interactive game instance may correspond to a multi-player online game such as discussed in other example embodiments above and below. At operation 620, a state machine may be instantiated, such as corresponding to a data driven state machine. The state machine be instantiated in one or more of a state machine client module (e.g., corresponding to a user-located state machine, such as instantiated using one or more client-located processors or devices), or a state machine server module (e.g., corresponding to a server-located state machine, such as instantiated using one or more remote-located processors or devices).

In some example embodiment, at operation 630, such as during execution of the game engine module, a state machine definition file (or other state machine data source such as a database) which includes scripting expressions may be parsed and executed as appropriate. Information may be obtained as a result of parsing and executing of the scripting expressions within the state machine definitions, such as obtaining information indicative of one or more of a state of an in-game object or a state transition of an in-game object, such as discussed in the examples above and below.

At operation 640, an in-game object may be controlled, interacted with, or modified, in the game instance via the state machine using at least a portion of the information obtained from parsing and executing the scripting expressions within the state machine definition. This may result in visible or non-visible changes to execution of the game instance resulting in the gaming user interface or the game engine.

For example, a series of textual state machine definitions may be established within an XML file or other data source for the textual state machine definitions, and include a plurality of scripting expressions in-line (such as in XML node values) to the textual definitions. Such definitions provide a functional operation of the state machine having a collection of states. The state machine during its operation keeps track of which state is active, and provides an entry-point describing item (e.g., in-game object) interaction. The scripting commands then may be used to perform certain actions (such as obtaining data values) during the determined state. The particular parameters and results of navigating through a plurality of states thus may be provided in connection with the data and scripting commands provided in the state machine definition.

Specifically, in one example embodiment, the state machine definition provided to a state machine may include information relevant to a state, action, requirement, cost, and effect as used with a scenario provided in a player-interactive game. As used in the following examples, the relationship between a state, action, requirement, cost, and effect may be expressed as follows:

State: Each state specifies how an item (e.g., a virtual game object) is displayed to a user, which actions may be performed on it, and whether the state will transition to another state. A state may have a limited duration, after which it will automatically transition to another state (e.g., a crop virtual object that grows from one state to another after a certain period of time). States may also specify which visual representation the item should use, and provide additional information for any display associated with the state.

Action: An action is something being done or potentially being done to a virtual item (e.g., harvesting a crop). Each action may specify a list of interaction "modes" in which it may be performed. In practice, these modes generally correspond to interaction modes such as game modes, but they may be embodied as strings used to filter available actions. Actions may specify a duration and whether they require some specific user action (such as having a player-controlled avatar to be next to the item in order to conduct or enable the selection of the action). Each action may also have a list of pre-requisites necessary in order to take the action. The pre-requisites may include requirements and/or costs. Finally, an action may provide a list of effects.

Requirement: Requirements specify some property, a comparison operator and a value (for example, that the player's experience level be less than three) for availability of an action. If the requirement is not met, the action is not available to be performed. In some examples the requirement may relate to an attribute or property of an in-game character controlled by the game player.

Cost: A cost is similar to a requirement except it is used to specify Player resources (for example, game resources such as coins, gems, energy, etc.), and the comparison is "greater than or equal to." Also, when the associated action is performed, the specified amount is deducted from the resource.

Effect: Effects indicate the results or consequences of associated events or actions. Each effect may be programmed to affect a specific thing, such as playing a sound or an animation, producing or changing some virtual object, or switching a state of some virtual item. In some examples, effects may change one or more properties of the virtual in-game character of the game player. For example, the effect of an action may increase an experience level or a score of the player. Thus, rather than writing logic to perform some result, an effect may be used to define what happens as a result of an action. With effects, a programmer may implement discrete portions of functionality that may then be composed into more complex actions by the designers.

The following XML example is used to demonstrate how a state machine definition with included scripting expressions may be implemented within a farming-type role playing game having a series of events for each of the farmed virtual goods. The following XML example, in particular, provides an example of a state machine definition for a crop, from a "seeds" state until a "withered" state.

```
<state machine name="crop" initial_state="seeds"
  <states>
    <state name="seeds" duration="10:00" next="grow1" tooltip="
Fully Grown in [time_until(grown)]"/>
    <state name="grow1" duration="10:00" next="grow2" tooltip="
Fully Grown in [time_until(grown)]"/>
    <state name="grow2" duration="10:00" next="grown" tooltip="
Fully Grown in [time_until(grown)]"/>
    <state name="grown" duration="2:00:00" next="withered" tool
tip="Fully Grown: Click to Harvest"
      <actions>
        <action name="Harvest" duration="0:03" progressText="Ha
rvesting..." mode="GMDefault">
          <effects>
            <effect type="PlayAnimation" target="Avatar" animat
ion="chop" duration="0:03"/>
            <effect type="GenerateInventoryItemFromTable" table
="Crop ItemTable"/>
            <effect type="ReplaceWithItemFromTable" table="Crop
_VarmintTable"/>
            <effect type="GenerateResource" resource="coins" mi
n="5" max="5"/>
            <effect type="GenerateResource" resource="experienc
e" min="10" max="10"/>
            <effect type="GenerateResource" resource="gems" min
="2" max="2"/>
          </effects>
          <costs>
            <cost resource="energy" amount="1"/>
          </costs>
        </action>
      </actions>
    </state>
    <state name="withered" tooltip="Withered: Click to Clear">
      <actions>
        <action name="Clear" duration="0:03" progressText="Clea
ring..." mode="GMDefault">
          <effects>
            <effect type="GenerateResource" resource="coins" mi
n="2" max="2"/>
            <effect type="ClearItem"/>
          </effects>
        </action>
      </actions>
    </state>
  </states>
</state machine>
```

Although each of the state values may be provided as text directly within the state machine definition, various values may be substituted and placed within the state machine definition text as appropriate, such as to provide further flexibility for the developer. For example, a scripting language implementing the scripting expressions described herein may be used for replacement of "tokens" within the state machine definition text with game data as appropriate during compilation, interpretation, or at run-time.

In the abbreviated XML state machine definition example included above, the use of the scripting expression "time_until (grown)" surrounded by [ ] tokens represents a scripting command that need not be determined or otherwise evaluated until build or until run-time. Such a "token replacement" scheme may include a substitution of a value or other expression for a specified token, such as a value determined at run-time, during compilation, or during interpretation of game code. This expression may be replaced in-line once its value is determined. Similar scripting expressions may be used to determine a wide variety of variables, or cause other scripting actions to be executed on the client or server.

Figure 7:
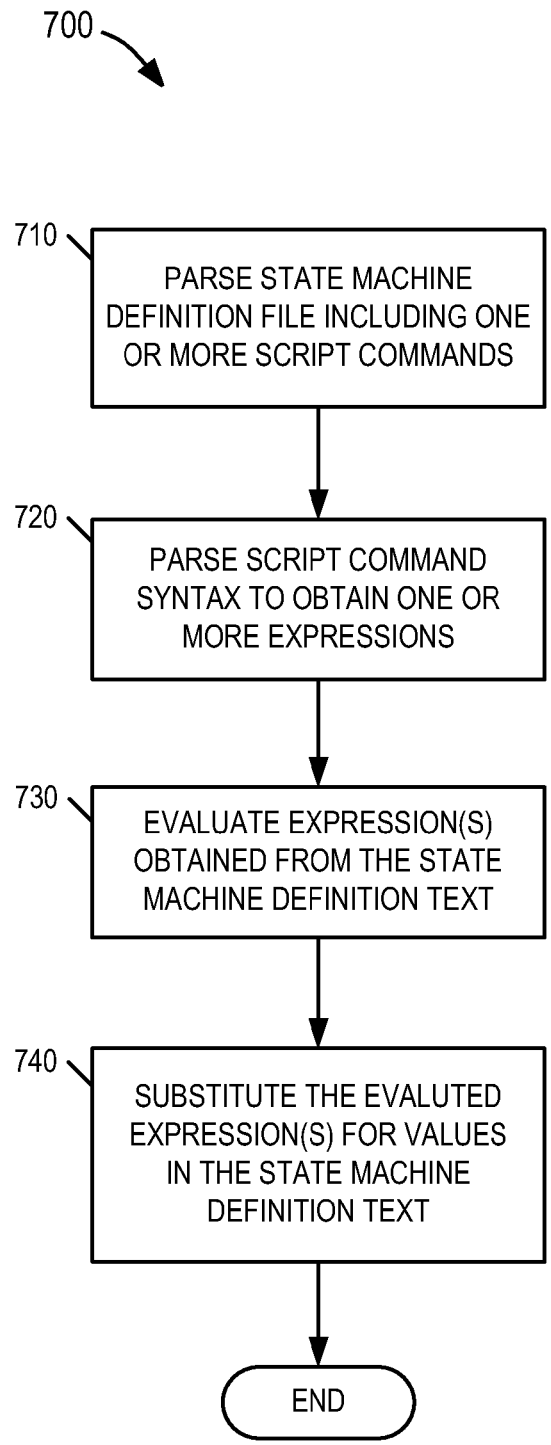
FIG. 7 illustrates an example flowchart of a method for interpreting state machine scripting and performing actions based on the state machine scripting in connection with particular disclosed embodiments.

FIG. 7 illustrates an example flowchart of a method 700 for interpreting state machine definition scripting and performing actions based on the state machine definition scripting in connection with some embodiments, such as to evaluate scripting within a state machine definition. The described sequence is provided as a non-limiting example, as the use of scripting expressions may involve addition, fewer, or substituted operations.

At operation 710, a state machine definition file may be parsed, such as performing text analysis to recognize one or more tokens indicating scripting commands within the definition file text. Such tokens within the definition file may be used in the state machine definitions to indicate information that is unspecified, such as values to be determined with scripting commands during execution (e.g., at run-time) using one or more other criteria.

At operation 720, identified scripting command syntax identified in the definition file may be parsed by the state machine scripting parser to obtain one or more expressions. The set of expressions may be relatively limited within the state machine definitions and used for such purposes as to simplify customization or localization for a particular game implementation, although more expansive scripting schemes may be possible. Such expressions may include one or more of a function to be performed on an in-game object, a literal expression, a geographically-specified text expression, a property of an in-game object, or one or more other expressions.

At operation 730, an expression obtained from the scripting command may be evaluated, executed, or otherwise interpreted by the state machine scripting parser, the state machine, or another scripting engine for use in determining or affecting a particular state of the game or game instance. This include invoking scripting commands to be executed in other applications on the client (e.g., with ActionScript in a client Flash interface) or the server (e.g., PHP commands on a web server). At operation 740, the result of the evaluated expression (for example, a value obtained from executing the scripting expression) may be substituted by the state machine for the scripting token included in the state machine definition text.

The format of the scripting commands (e.g., the scripting expressions included within tokens in the state machine definition XML) may include a variety of different structures. In one example embodiment, expressions in the state machine definition XML file may be delimited by square bracket text, "[" and "]," and may also support nested expressions, and concatenation of multiple arguments. In one example embodiment of such scripting expressions used within state machine definitions, a specific syntax for various scripting expression types may be as follows:

Function: [function_name(arg1, arg2, arg3)]
Property: [object. sub_object.property]
Literals: [3.14] [true] [5:00] [This, string, has, commas]
Localized Text: [key:{This is a localized parm,object: [params.string]}]

In some example embodiments, function calls may be supported according to a specified scope, such as a "global" scope. In a particular example embodiment, a literal colon-delimited time may be evaluated as an integer number of seconds.

In some example embodiments, script expressions may be used to obtain localized text. This may be used to provide English (or other) translation of strings in-line, at the location where they are used, such as for automatic generation of properties files by scraping the script at one or more of build time or run-time.

In some example embodiments, script expressions, such as obtained from within state machine definition text, may be evaluated according to a context. For example, a context may specify the functions or objects which are accessible to a particular script expression. Thus, exposure of particular functions or game objects to be evaluated may be controlled or restricted, and contexts may reference or "import" other contexts. There may also be a global context that may provide functions or other objects generally accessible to all expressions.

In some example embodiments, one or both of the state machine definitions or the state machine scripting commands may be parsed during compilation of executable code (e.g., at build-time), or during run-time of one or both of a client-side or server-side instance of a gaming environment. It will be apparent scripting commands may also be parsed or executed at other times in connection with operation of the state machine and state machine definitions in the gaming environment. Further, in other example embodiments, the state machine scripting commands may be provided to the state machine in a source other than the state machine definitions, for example, in a separate file or data stream.

The following provides additional implementation details on a system for providing a virtual gaming environment, and various architectural examples needed to implement multi-player online virtual gaming environment in conjunction with the presently described script-enabled state machine. Although a number of the state machine examples herein are provided with reference to such an example virtual gaming environment, it will be apparent that a state machine and state machine scripting may be implemented in other types of gaming environments including non-role playing games (e.g., strategy games, cooperative games), and games executing exclusively in a client-based or single computing system. Further, the state machine and state machine scripting techniques described herein may be applied in a variety of non-game software settings, such as a software environment where a series of actions and events occur in response to user interactivity.

Data Flow

Figure 8:
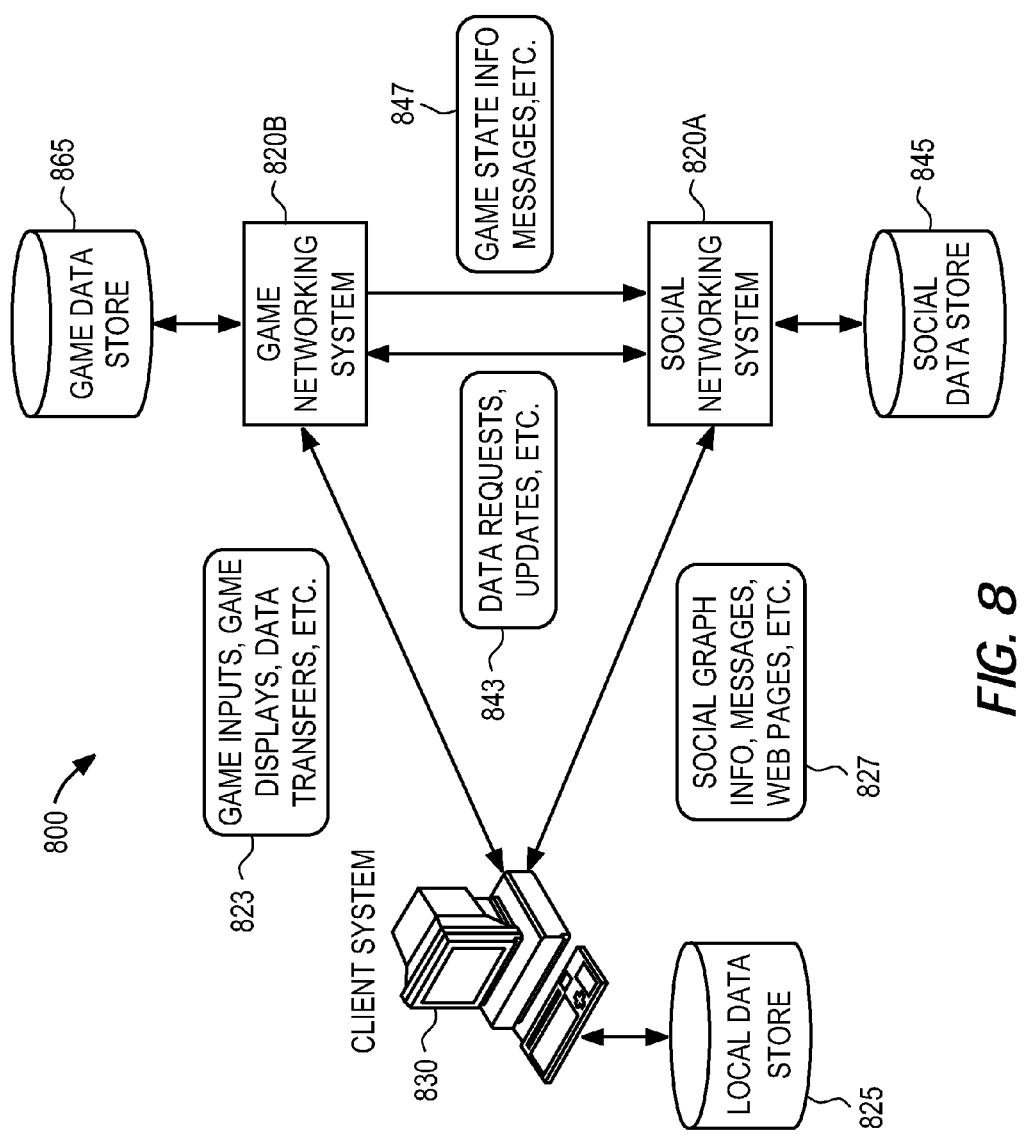
FIG. 8 illustrates an example data flow in a system.

FIG. 8 illustrates an example data flow between the components of an example system 800. In some example embodiments, system 800 may include client system 830, social networking system 820a, and game networking system 820b. A system 300 such as that described with reference to FIG. 3 may be provided by the client system 830, the social networking system 820a, or the game networking system 820b, or by any combination of these systems. The components of system 800 may be connected to each other in any suitable configuration, using any suitable type of connection. The components may be connected directly or over any suitable network. Client system 830, social networking system 820a, and game networking system 820b may each have one or more corresponding data stores such as local data store 825, social data store 845, and game data store 865, respectively. Social networking system 820a and game networking system 820b may also have one or more servers that may communicate with client system 830 over an appropriate network. Social networking system 820a and game networking system 820b may have, for example, one or more Internet servers for communicating with client system 830 via the Internet. Similarly, social networking system 820a and game networking system 820b may have one or more mobile servers for communicating with client system 830 via a mobile network (e.g., GSM, PCS, UMTS, HSPA, EVDO, LTE, LTE-A, Wi-Fi, WPAN, etc.). In some example embodiments, one server may be able to communicate with client system 830 over both the Internet and a mobile network. In other example embodiments, separate servers may be used.

Client system 830 may receive and transmit data 823 to and from game networking system 820b. This data may include, for example, webpages, messages, game inputs, game displays, HTTP packets, data requests, transaction information, updates, and other suitable data. At some other time, or at the same time, game networking system 820b may communicate data 843, 847 (e.g., game state information, game system account information, page info, messages, data requests, updates, etc.) with other networking systems, such as social networking system 820a (e.g., Facebook, Myspace, Google+, etc.). Client system 830 may also receive and transmit data 827 to and from social networking system 820a. This data may include, for example, webpages, messages, social graph information, social network displays, HTTP packets, data requests, transaction information, updates, and other suitable data.

Communication between client system 830, social networking system 820a, and game networking system 820b may occur over any appropriate electronic communication medium or network using any suitable communications protocols. For example, client system 830, as well as various servers of the systems described herein, may include Transport Control Protocol/Internet Protocol (TCP/IP) networking stacks to provide for datagram and transport functions. Of course, any other suitable network and transport layer protocols may be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In some example embodiments, the information transmitted between hosts may be formatted as HyperText Markup Language (HTML) documents. Other structured document languages or formats may be used, such as XML and the like. Executable code objects, such as JavaScript and ActionScript, may also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In some example embodiments, a client request may cause a server to respond with a first data object, such as an HTML page, which itself refers to other data objects. A client application, such as a browser, will request these additional data objects as it parses or otherwise processes the first data object.

In some example embodiments, an instance of an online game may be stored as a set of game state parameters that characterize the state of various in-game objects, such as, for example, player character state parameters, non-player character parameters, and virtual item parameters. In some example embodiments, game state is maintained in a database as a serialized, unstructured string of text data as a so-called Binary Large Object (BLOB). When a player accesses an online game on game networking system 820b, the BLOB containing the game state for the instance corresponding to the player may be transmitted to client system 830 for use by a client-side executed object to process. In some example embodiments, the client-side executable may be a FLASH-based game, which may de-serialize the game state data in the BLOB. As a player plays the game, the game logic implemented at client system 830 maintains and modifies the various game state parameters locally. The client-side game logic may also batch game events, such as mouse clicks, and transmit these events to game networking system 820b. Game networking system 820b may itself operate by retrieving a copy of the BLOB from a database or an intermediate memory cache (memcache) layer. Game networking system 820b may also de-serialize the BLOB to resolve the game state parameters and execute its own game logic based on the events in the batch file of events transmitted by the client to synchronize the game state on the server side. Game networking system 820b may then re-serialize the game state, now modified, into a BLOB, and pass this to a memory cache layer for lazy updates to a persistent database.

With a client-server environment in which the online games may run, one server system, such as game networking system 820b, may support multiple client systems 830. At any given time, there may be multiple players at multiple client systems 830 all playing the same online game. In practice, the number of players playing the same game at the same time may be very large. As the game progresses with each player, multiple players may provide different inputs to the online game at their respective client systems 830, and multiple client systems 830 may transmit multiple player inputs and/or game events to game networking system 820b for further processing. In addition, multiple client systems 830 may transmit other types of application data to game networking system 820b.

In some example embodiments, a computed-implemented game may be a text-based or turn-based game implemented as a series of web pages that are generated after a player selects one or more actions to perform. The web pages may be displayed in a browser client executed on client system 830. As an example and not by way of limitation, a client application downloaded to client system 830 may operate to serve a set of webpages to a player. As another example and not by way of limitation, a computer-implemented game may be an animated or rendered game executable as a stand-alone application or within the context of a webpage or other structured document. In some example embodiments, the computer-implemented game may be implemented using Adobe FLASH-based technologies. As an example and not by way of limitation, a game may be fully or partially implemented as a SWF object that is embedded in a web page and executable by a Flash media player plug-in. In some example embodiments, one or more described webpages may be associated with or accessed by social networking system 820a. This disclosure contemplates using any suitable application for the retrieval and rendering of structured documents hosted by any suitable network-addressable resource or website.

Application event data of a game is any data relevant to the game (e.g., player inputs). In some example embodiments, each application datum may have a name and a value, and the value of the application datum may change (i.e., be updated) at any time. When an update to an application datum occurs at client system 830, either caused by an action of a game player or by the game logic itself, client system 830 may need to inform game networking system 820*b* of the update. For example, if the game is a farming game with a harvest mechanic (such as Zynga FarmVille), an event may correspond to a player clicking on a parcel of land to harvest a crop. In such an instance, the application event data may identify an event or action (e.g., harvest) and an object in the game to which the event or action applies. For illustration purposes and not by way of limitation, system 800 is discussed in reference to updating a multi-player online game hosted on a network-addressable system (such as, for example, social networking system 820*a* or game networking system 820*b*), where an instance of the online game is executed remotely on a client system 830, which then transmits application event data to the hosting system such that the remote game server synchronizes the game state associated with the instance executed by the client system 830.

In some example embodiment, one or more objects of a game may be represented as an Adobe Flash object. Flash may manipulate vector and raster graphics, and supports bidirectional streaming of audio and video. "Flash" may mean the authoring environment, the player, or the application files. In particular example embodiments, client system 830 may include a Flash client. The Flash client may be configured to receive and run Flash application or game object code from any suitable networking system (such as, for example, social networking system 820*a* or game networking system 820*b*). In particular example embodiments, the Flash client may be run in a browser client executed on client system 830. A player may interact with Flash objects using client system 830 and the Flash client. The Flash objects may represent a variety of in-game objects. Thus, the player may perform various in-game actions on various in-game objects by making various changes and updates to the associated Flash objects. In some example embodiments, in-game actions may be initiated by clicking or similarly interacting with a Flash object that represents a particular in-game object. For example, a player may interact with a Flash object to use, move, rotate, delete, attack, shoot, or harvest an in-game object. This disclosure contemplates performing any suitable in-game action by interacting with any suitable Flash object. In some example embodiments, when the player makes a change to a Flash object representing an in-game object, the client-executed game logic may update one or more game state parameters associated with the in-game object. To ensure synchronization between the Flash object shown to the player at client system 830, the Flash client may send the events that caused the game state changes to the in-game object to game networking system 820*b*. However, to expedite the processing and hence the speed of the overall gaming experience, the Flash client may collect a batch of some number of events or updates into a batch file. The number of events or updates may be determined by the Flash client dynamically or determined by game networking system 820*b* based on server loads or other factors. For example, client system 830 may send a batch file to game networking system 820*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In some example embodiments, each application datum may have a name and a value. The value of an application datum may change at any time in response to the game play of a player or in response to the game engine (e.g., based on the game logic). In some example embodiments, an application data update occurs when the value of a specific application datum is changed. In some example embodiments, each application event datum may include an action or event name and a value (such as an object identifier). Thus, each application datum may be represented as a name-value pair in the batch file. The batch file may include a collection of name-value pairs representing the application data that have been updated at client system 830. In some example embodiments, the batch file may be a text file and the name-value pairs may be in string format.

In some example embodiments, when a player plays an online game on client system 830, game networking system 820*b* may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In some example embodiments, while a player is not playing the online game, the corresponding BLOB may be stored in the database. This enables a player to stop playing the game at any time without losing the current state of the game the player is in. When a player resumes playing the game next time, game networking system 820*b* may retrieve the corresponding BLOB from the database to determine the most-recent values of the game-related data. In some example embodiments, while a player is playing the online game, game networking system 820*b* may also load the corresponding BLOB into a memory cache so that the game system may have faster access to the BLOB and the game-related data contained therein.

Systems and Methods

In some example embodiments, one or more described webpages may be associated with a networking system or networking service. However, alternative example embodiments may have application to the retrieval and rendering of structured documents hosted by any type of network addressable resource or web site. Additionally, as used herein, a user may be an individual, a group, or an entity (such as a business or third party application).

Figure 9:
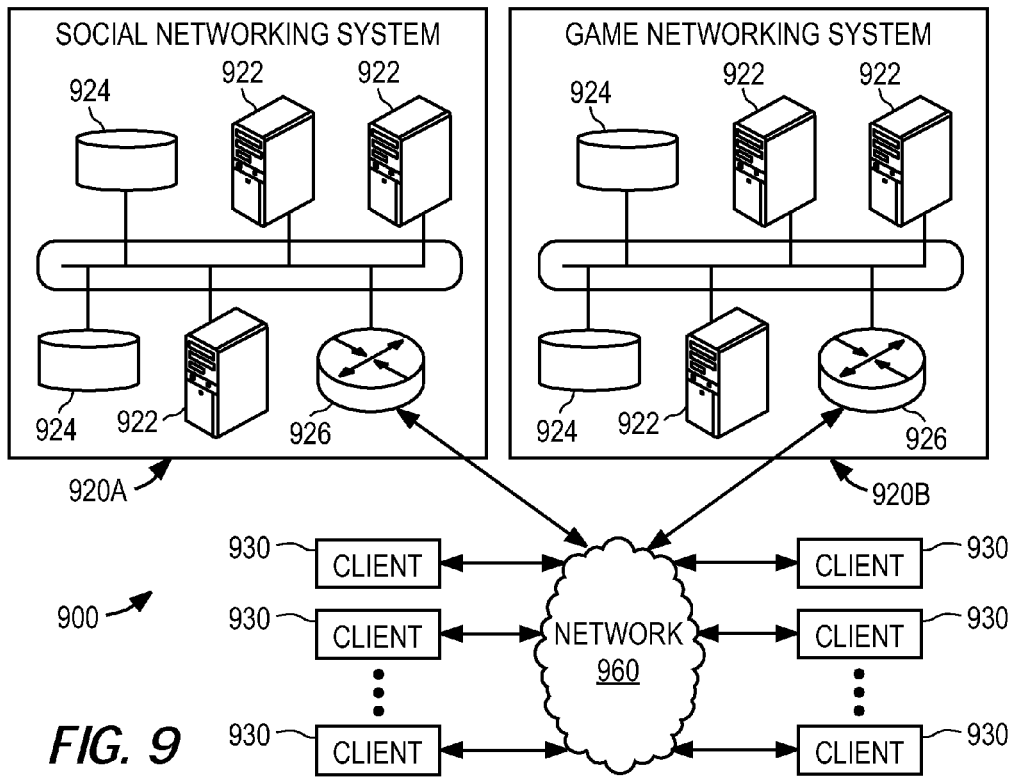
FIG. 9 illustrates an example network environment.

Some example embodiments may operate in a WAN environment, such as the Internet, including multiple network addressable systems. FIG. 9 illustrates an example network environment 900, in which various example embodiments may operate. Network cloud 960 generally represents one or more interconnected networks, over which the systems and hosts described herein, may communicate. Network cloud 960 may include packet-based WAN (such as the Internet), private networks, wireless networks, satellite networks, cellular networks, paging networks, and the like. As FIG. 9 illustrates, some example embodiments may operate in a network environment comprising one or more networking systems, such as social networking system 920*a*, game networking system 920*b*, and one or more client systems 930. The components of social networking system 920*a* and game networking system 920*b* operate analogously; as such, hereinafter they may be referred to simply at networking system 920. Client systems 930 are operably connected to the network environment via a network service provider, a wireless carrier, or any other suitable means.

Networking system 920 is a network addressable system that, in various example embodiments, comprises one or more physical servers 922 and data stores 924. The one or more physical servers 922 are operably connected to computer network 960 via, by way of example, a set of routers and/or networking switches 926. In an example embodiment, the functionality hosted by the one or more physical servers 922 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 922 may host functionality directed to the operations of networking system 920. Hereinafter servers 922 may be referred to as server 922, although server 922 may include numerous servers hosting, for example, networking system 920, as well as other content distribution servers, data stores, and databases. Data store 924 may store content and data relating to, and enabling, operation of networking system 920 as digital data objects. A data object, in some example embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 924 corresponds to one or more of a variety of separate and integrated databases, such as relational databases and object-oriented databases, that maintain information as an integrated collection of logically related records or files stored on one or more physical systems. Structurally, data store 924 may generally include one or more of a large class of data storage and management systems. In some example embodiments, data store 924 may be implemented by any suitable physical system(s) including components, such as one or more database servers, mass storage media, media library systems, storage area networks, data storage clouds, and the like. In one example embodiment, data store 924 includes one or more servers, databases (e.g., MySQL), and/or data warehouses. Data store 924 may include data associated with different networking system 920 users and/or client systems 930.

Client system 930 is generally a computer or computing device including functionality for communicating (e.g., remotely) over a computer network. Client system 930 may be a desktop computer, laptop computer, personal digital assistant (PDA), in- or out-of-car navigation system, smart phone or other cellular or mobile phone, or mobile gaming device, among other suitable computing devices. Client system 930 may execute one or more client applications, such as a web browser (e.g., Microsoft Internet Explorer, Mozilla Firefox, Apple Safari, Google Chrome, and Opera), to access and view content over a computer network. In some example embodiments, the client applications allow a user of client system 930 to enter addresses of specific network resources to be retrieved, such as resources hosted by networking system 920. These addresses may be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that may be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 930 desires to view a particular webpage (hereinafter also referred to as target structured document) hosted by networking system 920, the user's web browser, or other document rendering engine or suitable client application, formulates and transmits a request to networking system 920. The request generally includes a URL or other document identifier as well as metadata or other information. By way of example, the request may include information identifying the user, such as a user ID, as well as information identifying or characterizing the web browser or operating system running on the user's client computing device 930. The request may also include location information identifying a geographic location of the user's client system or a logical network location of the user's client system. The request may also include a timestamp identifying when the request was transmitted.

Although the example network environment described above and illustrated in FIG. 9 is described with respect to social networking system 920*a* and game networking system 920*b*, this disclosure encompasses any suitable network environment using any suitable systems. As an example and not by way of limitation, the network environment may include online media systems, online reviewing systems, online search engines, online advertising systems, or any combination of two or more such systems.

Figure 10:
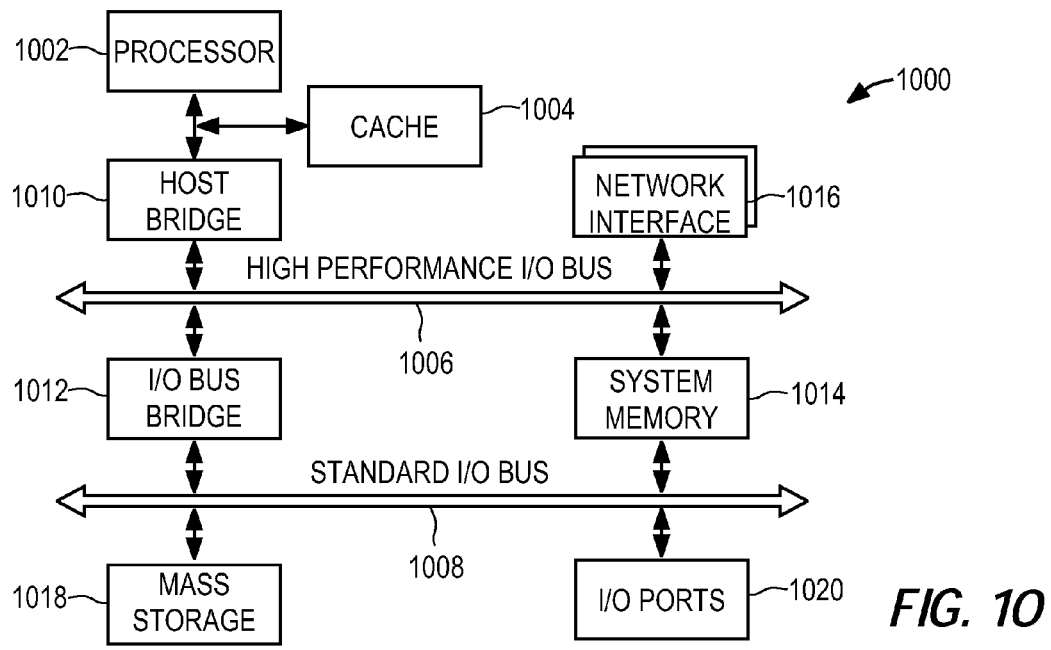
FIG. 10 illustrates an example computer system architecture.

FIG. 10 illustrates an example computing system architecture, which may be used to implement a server 922 or a client system 930. In one example embodiment, hardware system 1000 comprises a processor 1002, a cache memory 1004, and one or more executable modules and drivers, stored on a tangible computer readable medium, directed to the functions described herein. Additionally, hardware system 1000 may include a high performance input/output (I/O) bus 1006 and a standard I/O bus 1008. A host bridge 1010 may couple processor 1002 to high performance I/O bus 1006, whereas I/O bus bridge 1012 couples the two buses 1006 and 1008 to each other. A system memory 1014 and one or more network/communication interfaces 1016 may couple to bus 1006. Hardware system 1000 may further include video memory (not shown) and a display device coupled to the video memory. Mass storage 1018 and I/O ports 1020 may couple to bus 1008. Hardware system 1000 may optionally include a keyboard, a pointing device, and a display device (not shown) coupled to bus 1008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1000 are described in greater detail herein. In particular, network interface 1016 provides communication between hardware system 1000 and any of a wide range of networks, such as an Ethernet (e.g., IEEE 802.3) network, a backplane, and the like. Mass storage 1018 provides permanent storage for the data and programming instructions to perform the above-described functions implemented in servers 422, whereas system memory 1014 (e.g., DRAM) provides temporary storage for the data and programming instructions when executed by processor 1002. I/O ports 1020 are one or more serial and/or parallel communication ports that provide communication between additional peripheral devices, which may be coupled to hardware system 1000.

Hardware system 1000 may include a variety of system architectures and various components of hardware system 1000 may be rearranged. For example, cache 1004 may be on-chip with processor 1002. Alternatively, cache 1004 and processor 1002 may be packed together as a "processor module," with processor 1002 being referred to as the "processor core." Furthermore, certain embodiments of the present disclosure may not require nor include all of the above components. For example, the peripheral devices shown coupled to standard I/O bus 1008 may couple to high performance I/O bus 1006. In addition, in some example embodiments, only a single bus may exist, with the components of hardware system 1000 being coupled to the single bus. Furthermore, hardware system 1000 may include additional components, such as additional processors, storage devices, or memories.

An operating system manages and controls the operation of hardware system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other example embodiments are possible. For example, the functions described herein may be implemented in firmware or on an application-specific integrated circuit.

Furthermore, the above-described elements and operations may be comprised of instructions that are stored on non-transitory storage media. The instructions may be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Modules, Components, and Logic

Certain example embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various example embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering example embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other example embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Miscellaneous

One or more features from any embodiment may be combined with one or more features of any other embodiment without departing from the scope of the disclosure.

A recitation of "a," "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods described herein may be implemented using hardware components, software components, and/or any combination thereof. By way of example, while embodiments of the present disclosure have been described as operating in connection with a networking website, various embodiments of the present disclosure may be used in connection with any communications facility that supports web applications. Furthermore, in some example embodiments the term "web service" and "website" may be used interchangeably and additionally may refer to a custom or generalized API on a device, such as a mobile device (e.g., a cellular phone, smart phone, personal GPS, personal digital assistant, personal gaming device), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method of providing a dynamic gaming environment, comprising:
using one or more processors, executing a game engine module to provide an interactive game instance of a computer-implemented game;
obtaining a state machine definition from a server computer system, wherein the state machine definition defines a plurality of states of a plurality of graphical objects in an interactive display for the game, and wherein the plurality of states are used to control characteristics of the respective objects of the plurality of graphical objects;
instantiating a state machine instance from the state machine definition using a state machine module, wherein the state machine instance controls display of the plurality of graphical objects, wherein the state machine definition provides respective scripting functions to control the plurality of states of the plurality of graphical objects, and wherein the respective scripting functions receive one or more parameters, the one or more parameters being used to indicate one or more corresponding arguments that are unspecified at least in part until runtime;
in response to determination by the state machine module of a first state of a particular graphical object, generating a display of the particular graphical object in the interactive display of the game;
during execution of the game engine module, executing the respective scripting functions provided within the state machine definition using a scripting engine module, wherein execution of the respective scripting functions provide information to the game engine module indicative of one or both of a state of the particular graphical object or a state transition of the particular graphical object, and wherein execution of the respective scripting functions by the scripting engine module evaluates the information indicated by the one or more corresponding arguments; and
in response to determination by the state machine module of a second state of the particular graphical object, controlling a display property of the particular graphical object within the interactive game instance via the state machine instance using at least a portion of the information obtained from execution of the respective scripting functions.

2. The method of claim 1,
wherein the state machine instance includes respective first and second states providing information about how the particular graphical object will be displayed to a user;
wherein the state machine instance includes at least one action specifying a state transition of the particular graphical object between the first state and the second state; and wherein the controlling the particular graphical object includes:
  presenting information for display of the particular graphical object corresponding to the first state; and
  in response to the action specifying the state transition from the first state to the second state, presenting information for display of the particular graphical object corresponding to the second state.

3. The method of claim 1, wherein the state machine definition is provided in an extensible markup language (XML) format.

4. The method of claim 1, wherein instantiating the state machine instance includes parsing the respective scripting functions provided within the state machine definitions.

5. The method of claim 4, wherein the state machine definition provide the respective scripting functions having one or more tokens with script expressions included therein, the one or more tokens used in the state machine definition to indicate information that is unspecified at least in part in the state machine definition, and is determined during execution of the game engine module.

6. The method of claim 5,
  wherein parsing the respective scripting functions provided within the state machine definition includes parsing the respective scripting functions to obtain one or more expressions including one or more of a function to be performed on the particular graphical object, a literal expression, a geographically-specified text expression, or a property of the particular graphical object; and
  wherein the method includes:
    evaluating an expression obtained from the respective scripting functions; and
    in response, substituting the evaluated expression for the one or more tokens included in the state machine definition.

7. The method of claim 1, further comprising parsing the respective scripting functions during execution of the interactive game instance.

8. The method of claim 1, wherein the state machine module includes one or both of a client-located state machine client module or a server-located state machine server module.

9. The method of claim 8, wherein executing the game engine module includes using one or more client-located processors, and wherein instantiating the state machine instance results from instantiating the client-located state machine client module.

10. The method of claim 8, wherein executing the game engine module includes using one or more server-located processors, and wherein instantiating the state machine instance results from instantiating the server-located state machine server module.

11. The method of claim 1, further comprising exchanging information via a network between a user-located executing instance of a game engine module and a remotely-located executing instance of a game engine module; and
  wherein the interactive game instance provides a multi-player game including two or more respective user-located executing game instances corresponding to two or more respective participants in the multi-player game.

12. The method of claim 1,
  wherein the scripting engine module is a JavaScript engine adapted to execute JavaScript scripting functions, and
  wherein the respective scripting functions provided within the state machine definition are JavaScript expressions.

13. A non-transitory computer-readable storage medium comprising instructions that when executed by one or more processors of a computing system, cause the computing system to:
  provide a game engine, using a game engine module, to provide an interactive game instance of a game;
  obtaining a state machine definition from a server computer system, wherein the state machine definition defines a plurality of states of a plurality of graphical objects in an interactive display for the game, and wherein the plurality of states are used to control characteristics of the respective objects of the plurality of graphical objects:
  instantiate a state machine instance from the state machine definition using one or both of a state machine client module or a state machine server module, wherein the state machine definition provides respective scripting functions to control the plurality of states of the plurality of graphical objects, and wherein the respective scripting functions receive one or more parameters, the one or more parameters being used to indicate one or more corresponding arguments that are unspecified at least in part until runtime;
  in response to determination by the state machine client module or the state machine server module of a first state of a particular graphical object, generate a display of the particular graphical object in the interactive display of the game;
  during execution of the game engine module, execute the respective scripting functions provided within the one state machine definition using a scripting engine module, wherein execution of the respective scripting functions provide information to the game engine module indicative of one or both of a state of the particular graphical object or a state transition of the particular graphical object, wherein execution of the respective scripting functions by the scripting engine module evaluates the information indicated by the one or more corresponding arguments; and
  in response to determination by the state machine client module or the state machine server module of a second state of the particular graphical object, control a display property of the particular graphical object within the interactive game instance via the state machine instance using at least a portion of the information obtained from execution of the respective scripting functions.

14. The computer-readable storage medium of claim 13, wherein the state machine instance includes respective first and second states providing information about how the particular graphical object will be displayed to a user;
  wherein the state machine instance includes at least one action specifying a state transition of the particular graphical object between the first state and the second state; and
  wherein the instructions that cause the computing system to control the particular graphical object include instructions that cause the computing system to:
    present information for display of the particular graphical object corresponding to the first state; and
    in response to the action specifying the state transition from the first state to the second state, present information for display of the particular graphical object corresponding to the second state.

15. The computer-readable storage medium of claim 13, wherein the instructions that cause the computing system to instantiate the state machine instance include instructions that cause the computing system to parse the respective scripting and functions provided within the state machine definition.

16. The computer-readable storage medium of claim 15, wherein the state machine definition provide scripting functions having one or more tokens with script expressions therein, the one or more tokens used in the state machine definition to indicate information that is unspecified at least in part unspecified in the state machine definition, and is determined during execution of the interactive game instance.

17. The computer-readable storage medium of claim 16, wherein the instructions that cause the computing system to parse the respective-scripting functions provided within the state machine definition include instructions that cause the computing system to parse the respective scripting functions to obtain one or more expressions including one or more of a function to be performed on the particular graphical object, a literal expression, a geographically-specified text expression, or a property of the particular graphical object; and
wherein the computer-readable storage medium includes instructions that cause the computing system to:
evaluate an expression obtained from the respective scripting functions; and
in response, substitute the evaluated expression for the one or more tokens included in the state machine definition.

18. The computer-readable storage medium of claim 13, further comprising instructions that cause the computing system to exchange information via a network between a user-located executing instance of a game engine module and a remotely-located executing instance of a game-engine module; and
wherein the interactive game instance provides a multi-player game including two or more respective user-located executing instances corresponding to two or more respective participants in the multi-player game.

19. The computer-readable storage medium of claim 13, wherein the scripting engine module is a JavaScript engine adapted to execute JavaScript scripting functions, and
wherein the respective scripting functions provided within the state machine definition are JavaScript expressions.

20. A system, comprising:
one or more processors; and
one or more memory devices with instructions stored thereon, wherein the instructions are executed by the one or more processors to implement one or more modules, the one or more modules including:
a game engine module including instructions that, when executed by the one or more processors, provide interactive game instance of a game;
a state machine module operably coupled to the game engine module including instructions that, when executed by the one or more processors:
obtain a state machine definition from a server computer system, wherein the state machine definition defines a plurality of states of a plurality of graphical objects in an interactive display for the game, and wherein the plurality of states are used to control characteristics of the respective objects of the plurality of graphical objects;
instantiate a state machine instance from the state machine definition using one or both of a state machine client module or a state machine server module, wherein the state machine definition provides respective scripting functions to control the plurality of states of the plurality of graphical objects, and wherein the respective scripting functions receive one or more parameters, the one or more parameters being used to indicate one or more corresponding arguments that are unspecified at least in part until runtime;
in response to determination by the state machine client module or the state machine server module of a first state of a particular graphical object, generate a display of the particular graphical object in the interactive display of the game;
execute the respective scripting functions provided within the state machine definition to obtain information indicative of one or both of a state of the particular graphical object or a state transition of the particular graphical object, wherein one or both of the state machine client module or the state machine server module is further configured to perform the respective scripting functions and to determine the information indicated by the one or more parameters; and
in response to determination by the state machine module of a second state of the particular graphical object, control a display property of the particular graphical object within the interactive game instance via the state machine instance using at least a portion of the information obtained from execution of the respective scripting functions; and
a user interface display module operably coupled to the game engine module including instructions that, when executed by the one or more processors, present a display of the particular graphical object to a user.

21. The system of claim 20,
wherein the state machine instance defines respective first and second states providing information about how the particular graphical object will be displayed to the user;
wherein the state machine instance includes at least one action specifying a state transition of the particular graphical object between the first state and the second state; and
wherein the game engine module is further configured to:
present the particular graphical object corresponding to the first state for display, via the user interface display module; and
in response to the action specifying the state transition from the first state to the second state, present the particular graphical object corresponding to the second state for display, via the user interface display module.

22. The system of claim 20,
wherein the state machine module is configured to instantiate the state machine instance by parsing a state machine definition script file, the state machine definition script file including the state machine definition and providing the information indicative of one or both of a state of the particular graphical object or a state transition of the particular graphical object.

23. The system of claim 22,
wherein the state machine definition provide the respective scripting functions having one or more tokens with script expressions therein, the one or more tokens used in the state machine definition to indicate information that is unspecified at least in part in the state machine definition, and is determined during execution; and wherein the game engine module is configured to:

parse the respective scripting functions provided within the state machine definition to obtain one or more expressions including one or more of a function to be performed on the particular graphical object, a literal expression, a geographically-specified text expression, or a property of the particular graphical object;

evaluate an expression obtained from the respective scripting functions; and in response, substitute the evaluated expression for the one or more tokens included in the state machine definition.

24. The system of claim 20, further comprising a user-located game engine module and a remotely-located game engine module, the user-located game engine module and the remotely-located game engine module configured to exchange information via a network; and wherein the interactive game instance provides a multi-player game including two or more respective user-located game engine modules corresponding to two or more respective participants in the multi-player game.

25. The system of claim 20, wherein the state machine module is adapted to execute JavaScript scripting functions, and wherein the respective scripting functions provided within the state machine definition are JavaScript expressions.

* * * * *

UNITED STATES PATENT AND TRADEMARK OFFICE
CERTIFICATE OF CORRECTION

PATENT NO. : 9,463,386 B1
APPLICATION NO. : 13/460181
DATED : October 11, 2016
INVENTOR(S) : Chapman et al.

Page 1 of 1

It is certified that error appears in the above-identified patent and that said Letters Patent is hereby corrected as shown below:

In the Specification

In Column 13, Line 7, delete "server)" and insert --server).--, therefor

In Column 16, Line 14, delete "<state machine" and insert --<state_machine--, therefor In Column 16, Line 28, delete "="Crop ItemTable"/>" and insert --="Crop_ItemTable"/>--, therefor In Column 16, Line 40, delete "Clear"" and insert --Clear">--, therefor In Column 16, Line 51, delete "</state machine>" and insert --</state_machine>--, therefor In Column 17, Line 62, delete "[object. sub_object.property]" and insert --[object.sub_object.property]--, therefor In the Claims In Column 30, Line 17, in Claim 13, delete "objects:" and insert --objects;--, therefor In Column 30, Line 34, in Claim 13, after "the", delete "one", therefor In Column 31, Line 5, in Claim 15, after "scripting", delete "and", therefor Signed and Sealed this
Fifth Day of June, 2018

Andrei Iancu
*Director of the United States Patent and Trademark Office*